US011153868B2

(12) United States Patent
Takeda et al.

(10) Patent No.: US 11,153,868 B2
(45) Date of Patent: Oct. 19, 2021

(54) USER EQUIPMENT, WIRELESS BASE STATION, AND WIRELESS COMMUNICATION METHOD USING MULTIPLE TRANSMISSION TIME INTERVAL (TTI) LENGTHS

(71) Applicant: NTT DOCOMO, INC., Tokyo (JP)

(72) Inventors: Kazuaki Takeda, Tokyo (JP); Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/756,731

(22) PCT Filed: Aug. 31, 2016

(86) PCT No.: PCT/JP2016/075566
§ 371 (c)(1),
(2) Date: Mar. 1, 2018

(87) PCT Pub. No.: WO2017/038895
PCT Pub. Date: Mar. 9, 2017

(65) Prior Publication Data
US 2018/0255550 A1  Sep. 6, 2018

(30) Foreign Application Priority Data
Sep. 2, 2015  (JP) .............................. JP2015-173259

(51) Int. Cl.
*H04W 72/04* (2009.01)
*H04W 28/06* (2009.01)
(Continued)

(52) U.S. Cl.
CPC ......... *H04W 72/0446* (2013.01); *H04J 11/00* (2013.01); *H04L 5/0053* (2013.01);
(Continued)

(58) Field of Classification Search
CPC ............. H04W 72/0446; H04W 72/04; H04W 72/042; H04W 72/0406; H04W 72/1278;
(Continued)

(56) References Cited

U.S. PATENT DOCUMENTS 8,401,031 B2 * 3/2013 Park .................... H04W 74/006
370/431
2009/0245190 A1 * 10/2009 Higuchi .................. H04L 47/22
370/329
(Continued)

FOREIGN PATENT DOCUMENTS

CN         104468030 A    3/2015
EP           2709415 A1    3/2014
(Continued)

OTHER PUBLICATIONS

International Search Report of the International Searching Authority issued in PCT/JP2016/075566 dated Nov. 22, 2016 (1 page).
(Continued)

*Primary Examiner* — Warner Wong
(74) *Attorney, Agent, or Firm* — Osha Bergman Watanabe & Burton LLP

(57) ABSTRACT

Disclosed is to properly perform communications even in an environment enabled to use different TTI lengths in combination. User equipment in one aspect of the present invention includes: a control unit that specifies a configuration of a plurality of transmission time intervals (TTI: Transmission Time Interval) contained in one subframe of an existing system; and a reception unit that receives downlink control information at a radio resource receiving allocation of PDCCH (Physical Downlink Control Channel) of the existing system or at a first TTI of the plural TTIs, and receives data at, at least, one of the plural TTIs on the basis of the downlink control information.

2 Claims, 12 Drawing Sheets

(51) Int. Cl.
  *H04J 11/00* (2006.01)
  *H04L 5/00* (2006.01)
  *H04L 27/26* (2006.01)
  *H04W 48/16* (2009.01)
  *H04W 72/12* (2009.01)
(52) U.S. Cl.
  CPC .......... *H04L 5/0078* (2013.01); *H04L 5/0094* (2013.01); *H04L 27/2613* (2013.01); *H04W 28/06* (2013.01); *H04W 48/16* (2013.01); *H04W 72/04* (2013.01); *H04W 72/042* (2013.01); *H04W 72/1278* (2013.01)
(58) Field of Classification Search
  CPC ..... H04W 48/12; H04W 48/16; H04W 24/02; H04W 76/00; H04W 74/00; H04W 74/0002; H04L 65/1609; H04L 29/06326
  See application file for complete search history.

(56) References Cited

U.S. PATENT DOCUMENTS

| | | | |
|---|---|---|---|
| 2010/0067412 A1* | 3/2010 | Kitazoe | H04L 1/1812 370/294 |
| 2011/0032889 A1* | 2/2011 | Lee | H04W 74/006 370/329 |
| 2012/0287883 A1* | 11/2012 | Sabella | H04L 1/0003 370/329 |
| 2013/0003604 A1* | 1/2013 | Blankenship | H04L 5/0023 370/255 |
| 2013/0039188 A1* | 2/2013 | Larsson | H04L 1/0039 370/241 |
| 2013/0308504 A1* | 11/2013 | Nimbalker | H04L 5/001 370/281 |
| 2014/0071954 A1* | 3/2014 | Au | H04W 72/0446 370/336 |
| 2015/0085685 A1* | 3/2015 | Majjigi | H04L 25/0202 370/252 |
| 2015/0109972 A1* | 4/2015 | Khoryaev | H04L 65/1069 370/280 |
| 2015/0131560 A1* | 5/2015 | Von Elbwart | H04W 72/042 370/329 |
| 2015/0180619 A1* | 6/2015 | Majjigi | H04L 5/0005 370/330 |
| 2015/0230286 A1 | 8/2015 | Feuersaenger et al. | |
| 2015/0264662 A1* | 9/2015 | Sahlin | H04W 72/1289 370/280 |
| 2015/0271802 A1* | 9/2015 | Kang | H04L 5/0092 370/329 |
| 2015/0341912 A1* | 11/2015 | Kim | H04W 72/042 370/329 |
| 2015/0358925 A1* | 12/2015 | Nobukiyo | H04W 16/32 455/522 |
| 2015/0365181 A1* | 12/2015 | Nagata | H04L 27/2275 370/329 |
| 2016/0036618 A1* | 2/2016 | Einhaus | H04L 1/0003 370/329 |
| 2016/0043848 A1* | 2/2016 | Kim | H04L 5/0051 370/280 |
| 2016/0295584 A1* | 10/2016 | Chen | H04W 72/0446 |
| 2016/0337150 A1* | 11/2016 | Larsson | H04L 1/0025 |
| 2016/0353436 A1* | 12/2016 | Au | H04L 1/1861 |
| 2017/0163396 A1* | 6/2017 | Blankenship | H04L 1/0031 |
| 2017/0164363 A1 | 6/2017 | Zhang et al. | |
| 2017/0318562 A1* | 11/2017 | Pang | H04W 72/04 |
| 2018/0034597 A1* | 2/2018 | Uchino | H04W 16/32 |
| 2018/0084572 A1* | 3/2018 | You | H04L 5/00 |
| 2018/0176934 A1* | 6/2018 | Uchino | H04W 72/085 |
| 2018/0184443 A1* | 6/2018 | Li | H04W 72/1247 |
| 2018/0249399 A1* | 8/2018 | Takeda | H04W 48/10 |
| 2018/0331816 A1* | 11/2018 | Harada | H04L 1/1664 |
| 2020/0214007 A1 | 7/2020 | Mochizuki et al. | |

FOREIGN PATENT DOCUMENTS

| | | | |
|---|---|---|---|
| EP | 3179654 A1 | 6/2017 | |
| WO | 2016040290 A1 | 3/2016 | |
| WO | 2016048570 A1 | 3/2016 | |
| WO | 2016053844 A1 | 4/2016 | |
| WO | 2016064059 A1 | 4/2016 | |
| WO | 2016069270 A1 | 5/2016 | |
| WO | WO-2017008609 A1 * | 1/2017 | ............ H04W 72/04 |
| WO | 2017026159 A1 | 2/2017 | |

OTHER PUBLICATIONS

Written Opinion of the International Searching Authority issued in PCT/JP2016/075566 dated Nov. 22, 2016 (4 pages).
Ericsson; "Study of shorter TTI for latency reduction"; 3GPP TSG-RAN WG2 #91, R2-153493; Beijing, China; Aug. 24-28, 2015 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16841925.7, dated Mar. 6, 2019 (8 pages).
Office Action issued in Japanese Application No. 2017-538085; dated Jun. 2, 2020 (11 pages).
Office Action issued in Japanese Application No. 2017-538085; dated Nov. 4, 2020 (6 pages).

* cited by examiner

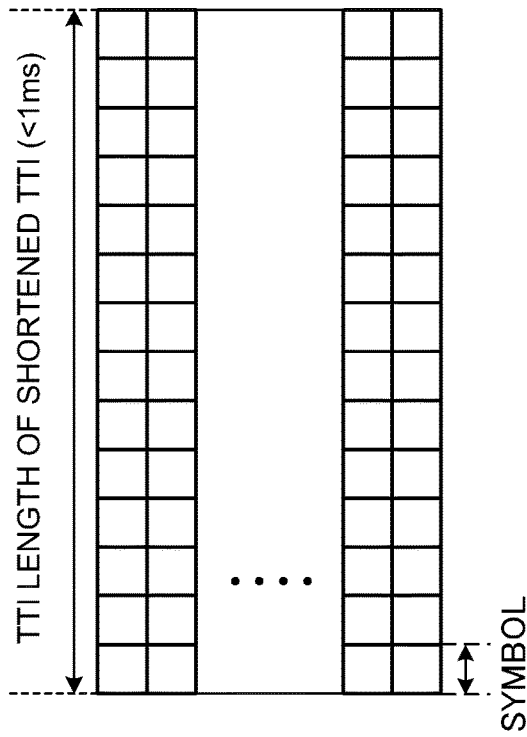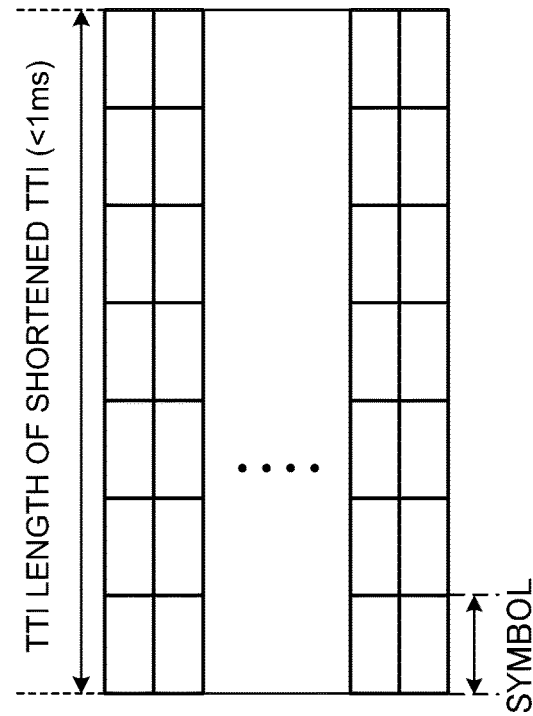
FIG. 3A
FIG. 3B

FIG. 7A

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

FIG. 7B

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 25 | 19080 | 19848 | 19848 | 20616 | 21384 | 22152 | 22920 | 22920 | 23688 | 24496 |
| 26 | 19848 | 20616 | 20616 | 21384 | 22152 | 22920 | 23688 | 24496 | 24496 | 25456 |

USER EQUIPMENT, WIRELESS BASE STATION, AND WIRELESS COMMUNICATION METHOD USING MULTIPLE TRANSMISSION TIME INTERVAL (TTI) LENGTHS

TECHNICAL FIELD

The present invention pertains to user equipment, a wireless base station, a wireless communication method, and a wireless communication system in a next generation mobile communication system.

BACKGROUND ART

A Long Term Evolution (LTE) (Non-patent document 1) was standardized for the purpose of attaining a much faster data rate and decreasing a delay in a UMTS (Universal Mobile Telecommunications System) network. An examination of a succeeding system (called LTE-A (LTE-Advanced), FRA (Future Radio Access), 5G (5th generation mobile communication system), or New-RAT (Radio Access Technology)) is underway in order to aim at attaining a much broader band and greater acceleration than LTE.

LTE Rel.10/11 introduces Carrier Aggregation (CA) for aggregating a plurality of Component Carriers (CCs) in order to broaden the band. Each CC is configured so that a system band of LTE Rel.8 is set as one unitary band. According the CA, the plurality of CCs of the same wireless base station (eNB (evolved NodeB)) is set in the User Equipment (UE).

On the other hand, LTE Rel.12 introduces Dual Connectivity (DC) schemed so that a plurality of Cell Groups (CGs) of different wireless base stations are set in the UE. Each cell group is organized by at least one cell (CC). The DC is configured to aggregate the plurality of CCs of the different wireless base stations, and is therefore also called "Inter-eNB CA".

According to LTE Rel.8-12 described above, the TTI (Transmission Time Interval) applied to the DL transmission the UL transmission between the wireless base station and the UE is set to 1 ms. The transmission time interval is also called a transfer time interval (TTI), and the TTI in the LTE system (Rel.8-12) is also called a subframe length.

DOCUMENTS OF PRIOR ART

Non-Patent Document

[Non-Patent Document 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF THE INVENTION

Problems to be Solved by the Invention

The wireless communication system (e.g., 5G) from LTE Rel.13 onward assumes performing communications with a relatively small data size as exemplified by communications at a frequency band as high as several tens of GHz, IoT (Internet of Things), MTC (Machine Type Communication), and M2M (Machine To Machine). When applying a communication method (with the TTI (Transmission Time Interval) being, e.g., 1 ms) based on LTE Rel.8-12 to those future wireless communication systems, there exists a problem of being unable to provide sufficient communication services. There are also increasing demands for D2D (Device To Device) communications and V2V (Vehicular To Vehicular) communications, which entail low-delay communications.

An examination of a reduction of communication delay (latency reduction) is underway in order to provide sufficient communication services to such future wireless communication systems. For example, such an examination is underway as to performing communications by using a TTI (which may be called, e.g., a shortened TTI) configured by reducing a transmission time interval (TTI: Transmission Time Interval), defined as a minimum time unit of scheduling, from 1 ms of an existing LTE system (LTE Rel.8-12).

However, when introducing the shortened TTI, a specific signal/channel configuration is not yet examined, and a problem of how to control communications when using a conventional TTI and the shortened TTI in combination (including when used in switchover) exists. For example, a demand is to establish a communication control method suited to the shortened TTI when UE (User Equipment) connects to a plurality of cells using different types of TTIs (having different TTI lengths).

One object of the present invention, conceived in view of such points, is to provide user equipment, a wireless base station, a wireless communication method and a wireless communication system each capable of properly performing communications even in an environment enabled to use different TTI lengths in combination.

Means for Solving the Problems

According to one aspect of the present invention, user equipment includes: a control unit that specifies a configuration of a plurality of transmission time intervals (TTI: Transmission Time Interval) contained in one subframe of an existing system; and a reception unit that receives downlink control information at a radio resource receiving allocation of PDCCH (Physical Downlink Control Channel) of the existing system or at a first TTI of the plural TTIs, and receives data at, at least, one of the plural TTIs on the basis of the downlink control information.

Effect of the Invention

According to the present invention, the communications can be properly performed even in the environment enabled to use the different TTI lengths in combination.

BRIEF DESCRIPTION OF THE DRAWINGS

FIG. 3A is a diagram illustrating an example of a first configuration of the shortened TTI; and FIG. 3B is a diagram illustrating an example of a second configuration of the shortened TTI.

FIG. 7A is a diagram illustrating part of an existing TBS table; and 7B is a diagram illustrating part of a TBS table according to a method 1 in a second embodiment.

MODE FOR CARRYING OUT THE INVENTION

Figure 1:
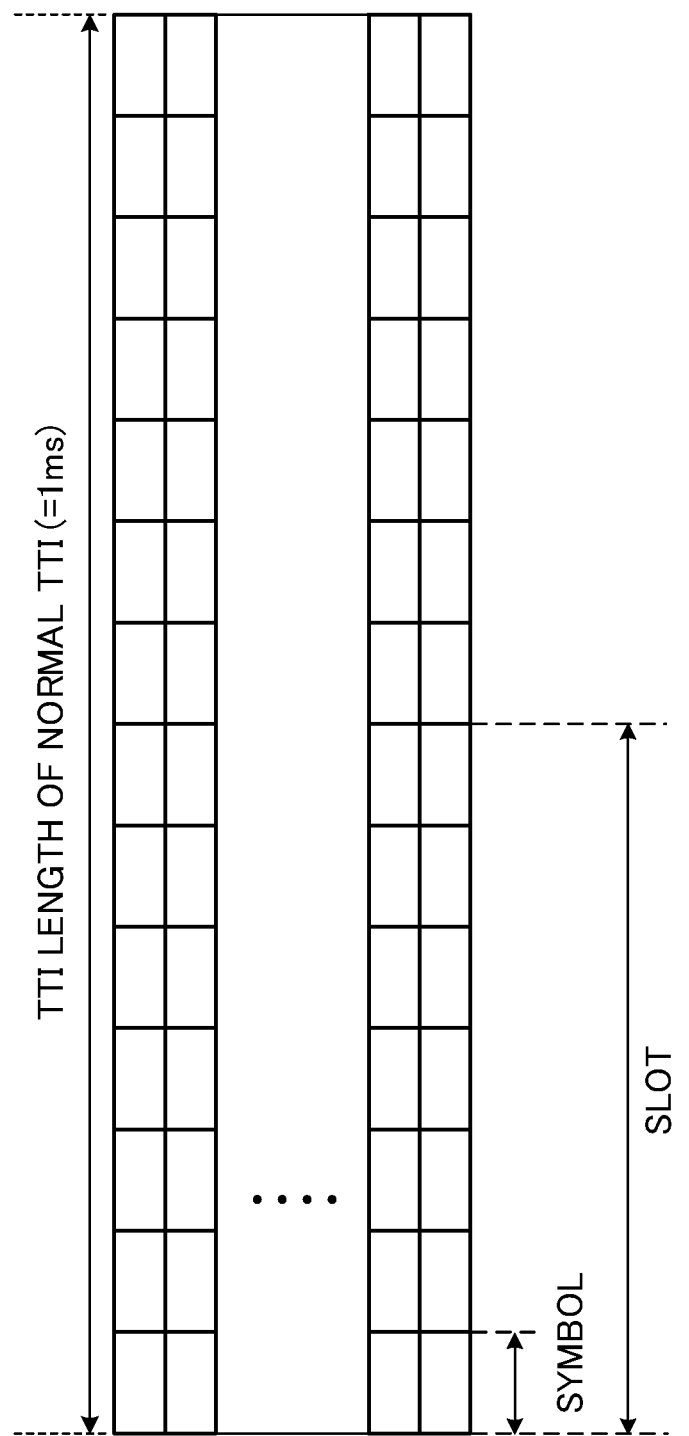
FIG. 1 is an explanatory diagram of a TTI in an existing LTE system.

FIG. 1 is an explanatory diagram of a TTI (Time Transmission Interval) in an existing LTE system. As illustrated in FIG. 1, the TTI (which may be called, e.g., a normal TTI) in LTE Rel.8-12 has a time length "1 ms". A normal TTI is also called a subframe and is configured to include two time slots. The normal TTI is called a subframe and configured to include two time slots of 0.5 ms. The normal TTI is defined as a transmission time unit of a 1 channel-coded data/packet (transport block) and also a processing unitary parameter for Scheduling, Link Adaptation and other equivalent communication schemes.

FIG. 1 illustrates a subframe configuration of a normal cyclic prefix (CP). For example, in the case of downlink (DL) using the normal CP, the normal TTI is configured to include 14 OFDM (Orthogonal Frequency Division Multiplexing) symbols (7 OFDM symbols per slot). Each OFDM symbol has a time length (symbol length) of 66.7 μS and is attached with the normal CP of 4.76 μs. The symbol length and a subcarrier spacing are mutually in a multiplicative inverse relationship, and hence the subcarrier spacing is 15 kHz when the symbol length is 66.7 μs.

In the case of an uplink (UL) using the normal cyclic prefix (CP), the normal TTI is configured to include 14 SC-FDMA (Single Carrier Frequency Division Multiple Access) symbols (7 SC-FDMA symbols per slot). Each SC-FDMA symbol has a time length (symbol length) of 66.7 μs, and is attached with the normal CP of 4.76 μs. The symbol length and the subcarrier spacing are mutually in the multiplicative inverse relationship, and therefore the subcarrier spacing is 15 kHz when the symbol length is 66.7 μs.

Note that the normal TTI may also be configured to include the 12 OFDM symbols (or 12 SC-FDMA symbols) in the case of an extended CP. In this case, each OFDM symbol (or each SC-FDMA symbol) has a time length of 66.7 μs, and is attached with the extended CP of 16.67 μs.

By the way, interfaces desired in a future wireless communication system instanced by 5G and LTE Rel.13 onward are wireless interfaces suited to a frequency band as high as several tens of GHz and wireless interfaces configured to minimize delays in IoT, MTC, M2M, D2D and V2V.

Figure 2:
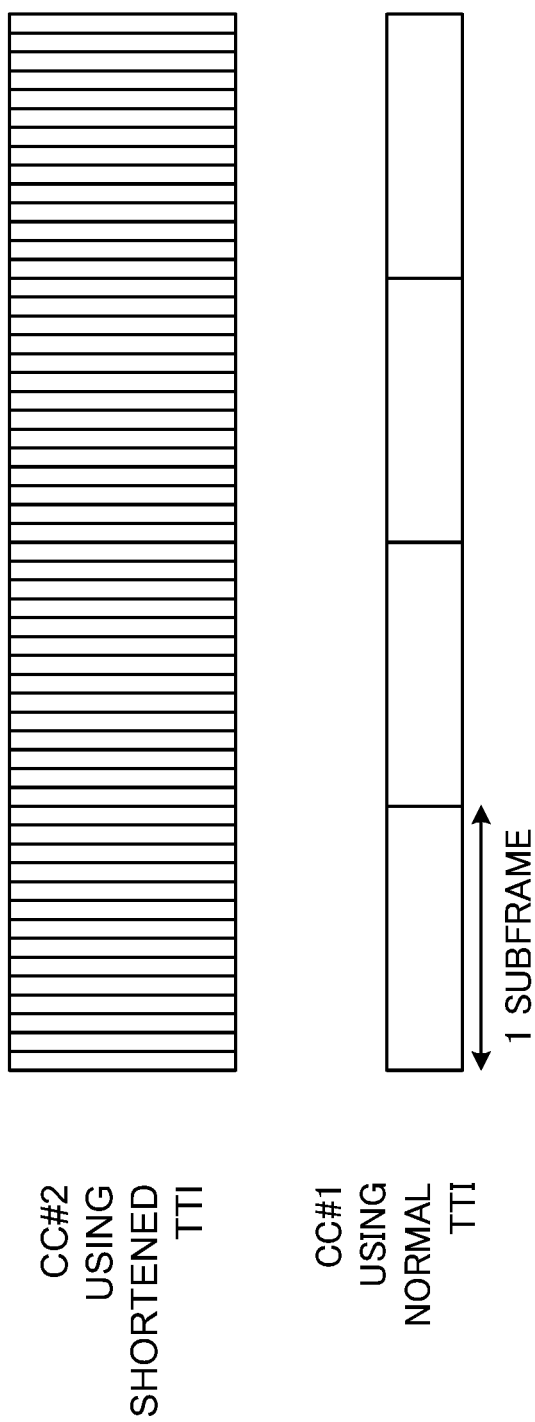
FIG. 2 is an explanatory diagram of a normal TTI and a shortened TTI.

It is therefore considered in the future communication system that the communications are performed by making use of a TTI with the normal TTI being made shorter (shortened) than 1 ms (which may be called, e.g., a shortened TTI). The shortened TTI will be described with reference to FIG. 2. FIG. 2 is an explanatory diagram of the normal TTI and the shortened TTI. FIG. 2 illustrates a cell (CC #1) using the normal TTI (1 ms), and a cell (CC #2) employing the shortened TTI. When using the shortened TTI, a subcarrier spacing may be changed (e.g., expanded) from the subcarrier of the normal TTI.

When using the TTI shorter in time length than the normal TTI (shortened TTI), there increases a timewise margin against processing (e.g., coding, decoding and other equivalent processing) in user equipment (UE) and a wireless base station, thereby enabling a processing delay to be decreased. When using the shortened TTI, it is feasible to increase a number of the user equipments receivable per unit time (e.g., 1 ms). The following is a description of a configuration and other equivalent items of the shortened TTI.

Example of Configuration of Shortened TTI

An example of a configuration of the shortened TTI will be described with reference to FIG. 3. FIG. 3 is a diagram illustrating one example of the configuration of the shortened TTI. As depicted in FIGS. 3A and 3B, the shortened TTI has a time length (TTI length) shorter than 1 ms. The shortened TTI may have such a TTI length that a multiple of, e.g., 0.5 ms, 0.25 ms, 0.2 ms and 0.1 ms becomes 1 ms. The shortened TTI can be thereby introduced while keeping a compatibility with the normal TTI, i.e., 1 ms. Alternatively, the shortened TTI can be also configured on a symbol-by-symbol basis (e.g., 1/14 ms).

Note that an instance of the normal CP will be described by way of one example in FIGS. 3A and 3B, but the embodiment is not limited to this instance. It may be sufficient that the shortened TTI has a time length shorter than the normal TTI, and all types of configurations of a symbol count, a symbol length and a CP length within the shortened TTI may be taken. The following discussion will describe an example in which the OFDM symbol is used in the DL, while the SC-FDMA symbol is used in the UL, but the embodiment is not limited to this example.

FIG. 3A is the diagram illustrating a first configuration example of the shortened TTI. As illustrated in FIG. 3A, the first configuration example is that the shortened TTI is configured to include the same 14 OFDM symbols (or SC-FDMA symbols) as those of the normal TTI, and each OFDM symbol (each SC-FDMA symbol) has the symbol length shorter than the symbol length of the normal TTI (=66.7 μs).

As depicted in FIG. 3A, a signal configuration of a physical layer of the normal TTI can be diverted to when shortening the symbol length while keeping the symbol count of the normal TTI. When shortening the symbol length by keeping the symbol count of the normal TTI, the sub-carrier spacing augments, and hence an information content (bit quantity) contained in the shortened TTI can be shortened to a greater degree than the normal TTI.

FIG. 3B is a diagram illustrating a second configuration example of the shortened TTI. As depicted in FIG. 3B, the second configuration example is that the shortened TTI is configured to include a lesser number of OFDM symbols (or SC-FDMA symbols) than those of the normal TTI, and each OFDM symbol (each SC-FDMA symbol) has the same symbol length (=66.7 μs) as that of the normal TTI. For example, in FIG. 3B, the shortened TTI is configured to include 7 OFDM symbols (SC-FDMA symbols), which is half of the symbols of the normal TTI.

As illustrated in FIG. 3B, when reducing the symbol count while maintaining the symbol length, the information content (bit quantity) contained in the shortened TTI can be shortened to a degree greater than the normal TTI. The user equipment is thereby able to execute a process (instanced by demodulating, decoding and sounding (quality testing)) of receiving a signal contained in the shortened TTI in a shorter length of time than the normal TTI, and to shorten the processing delay. The signal of the shortened TTI illustrated in FIG. 3B and a signal of the normal TTI can be multiplexed (e.g., OFDM multiplexing) by the same CC (Component Carrier), whereby the compatibility with the normal TTI can be maintained.

Setting Example of Shortened TTI

A setting example of the shortened TTI will be described. When applying the shortened TTI, such a configuration is also available that both of the normal TTI and the shortened TTI are set in the user equipment in order to have compatibility with LTE Rel.8-12. FIG. 4 is a diagram illustrating one example of setting the normal TTI and the shortened TTI. Note that FIG. 4 simply illustrates merely an exemplification, and the embodiment is not limited thereto.

Figure 4A:
FIG. 4A is a diagram illustrating a first setting example of the shortened TTI.

FIG. 4A is a diagram illustrating a first setting example. As depicted in FIG. 4A, the normal TTIs and the shortened TTIs may coexist timewise within the same component carrier (CC) (frequency domain). Specifically, the shortened TTI may be set in a specified subframe (or a specified radio frame) of the same CC. For example, with the same CC in FIG. 3A, the shortened TTI is set in 5 consecutive subframes, and the normal TTIs are set in other subframes. Note that the number and positions of the subframes in which to set the shortened TTI are not limited to those illustrated in FIG. 3A. For example, the shortened TTI may be a subframe that enables setting of MBSFN (Multicast Broadcast Single Frequency Network) subframe, and may also be a subframe containing (or not containing) broadcast information (e.g., MIB (Master Information Block)) and a specified signal instanced by a synchronization signal.

In FIG. 4A, within the same CC, the shortened TTIs are set in 5 consecutive subframes (corresponding to 5 normal TTIs), and the normal TTIs are set in other subframes. Note that the number and positions of the subframes in which to set the shortened TTIs are not limited to those illustrated in FIG. 4A.

Figure 4B:
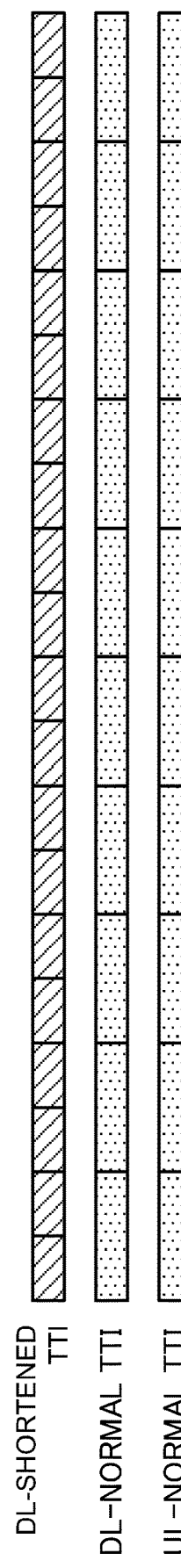
FIG. 4B is a diagram illustrating a second setting example of the shortened TTI.

FIG. 4B is a diagram illustrating a second setting example of the shortened TTI. As depicted in FIG. 4B, carrier aggregation (CA) or dual connectivity (DC) may also be implemented by integrating the CCs of the normal TTIs and the CC of the shortened TTI. Specifically, the shortened TTI may be set in a specified CC (more specifically in the DL and/or the UL of the specified CC).

In FIG. 4B, the shortened TTI is set in the DL of the specified CC, while the normal TTIs are set in the DL and the UL of other CCs. Note that the number and the positions of the CCs in which to set the shortened TTIs are not limited to those illustrated in FIG. 4B.

The CA allows the shortened TTI to be set in the specified CC (a primary (P) cell and/or secondary (S) cell) of the same wireless base station. By contrast, the DC allows the shortened TTI to be set in the specified CC (P cell and/or S cell) within a master cell group (MCG) configured by a first wireless base station and also in a specified CC (primary secondary (PS) cell and/or S cell) within a secondary group (SCG) configured by a second wireless base station.

Figure 4C:
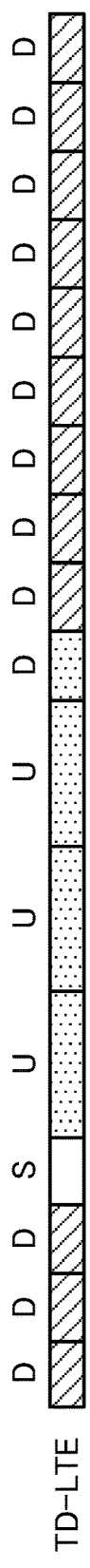
FIG. 4C is a diagram illustrating a third setting example of the shortened TTI.

FIG. 4C is a diagram illustrating a third setting example of the shortened TTI. As depicted in FIG. 4C, the shortened TTI may be set in any one of the DL and the UL. For example, FIG. 4C illustrates an example wherein the normal TTI is set in the UL, while the shortened TTI is set in the DL in a TDD (Time Division Duplex) system.

Specified channels and signals of the DL or the UL may be allocated (set) to the shortened TTIs. For example, an available configuration is that an uplink control channel (PUCCH: Physical Uplink Control Channel) is allocated to the normal TTIs, while an uplink shared channel (PUSCH: Physical Uplink Shared Channel) is allocated to the shortened TTIs.

A multi access method different from the OFDM (or the SC-FDMA) classified as the multi access method based on LTE Rel.8-12 may also be assigned (set) to the shortened TTIs.

As described above, it is assumed that the future wireless communications are performed by applying the shortened TTI, into which the transmission time interval (TTI) is shortened from the normal TTI, to the UL transmission and/or the DL transmission. The present inventors focused on such a point that a transition stage to, e.g., a future wireless communication system has a high possibility of using, as illustrated in FIG. 4, the shortened TTIs and the TTIs (the normal TTIs) of the existing system in combination.

Such being the case, the present inventors conceived an idea that the communications are performed by employing a radio resource configuration having a high affinity with a downlink radio resource configuration of the existing LTE system even when using the shortened TTIs. To be specific, the present inventors found that the plurality of TTIs are specified by dividing one subframe of the existing system, and a signal configuration (a mapping pattern of the radio resource) assigned to the existing system is adopted to the greatest possible degree. The present inventors reached one aspect of the present invention by examining contents of control information (scheduling information) and mapping of control signals, which are suited to a case of using the plurality of TTIs.

According to one aspect of the present invention, e.g., one cell (eNB) controls the communications of the plurality of TTIs, thereby enabling synchronization between the shortened TTIs and the normal TTIs and a sufficient exhibition of an effect in a decreased delay due to the shortened TTIs.

An in-depth description of an embodiment of the present invention will hereinafter be made with reference to the accompanying drawings. In the following discussion, a transmission unitary parameter of the time length shorter than the normal TTI (1 ms) is called the shortened TTI, but the embodiment is not limited to this nomenclature. The following discussion will exemplify the LTE system, and the present invention may be applied to other types of systems.

Note that a region (indicated by symbol numbers 0-2 of the first slot in one subframe of the existing system), to which a downlink control channel (e.g., PDCCH (Physical Downlink Control Channel)) is allocated, does not configure the TTI and/or is not contained in the TTI length in the following discussion, but the embodiment is not limited to this scheme. For example, in the following discussion, the first TTI in one subframe of the existing system may configure one TTI inclusively of the downlink control channel region. A symbol containing a specified signal (e.g., a cell specific reference signal (CRS (Cell-specific Reference Signal), a synchronization signal (e.g., PSS (Primary Synchronization Signal)/SSS (Secondary Synchronization Signal))) may not configure the TTI and/or may not be contained in the TTI length.

The following discussion will describe an example wherein the normal CP is inserted in the normal TTIs, and the present invention can, however, be applied to even an extended CP, with reference to the present specification. Note that wireless communication methods according to respective embodiments may be applied solely and may also be applied in combination.

Wireless Communication Method

First Embodiment

A first embodiment of the present invention pertains to the downlink control channel.

To start with, radio source mapping of the shortened TTIs according to the present invention will be described. According to one aspect of the present invention, the plurality of TTIs are specified by dividing one subframe of the existing system. For example, the resource mapping configurations (TTI configurations) given below may be used:

(1) the plurality of TTIs are configured to include a first TTI configured by 6 symbol lengths starting from a symbol number 3 of the first slot in one subframe of the existing system, and a second TTI configured by 5 symbol lengths starting from a symbol immediately after the first TTI;

(2) the plurality of TTIs are configured by 1 or 2 symbol lengths in a way that uses the symbols excluding the symbol numbers 0-2 of the first slot in one subframe of the existing system;

(3) the plurality of TTIs are configured to include the first TTI configured by 4 symbol lengths starting from a symbol number 2 of the first slot in one subframe of the existing system, the second TTI configured by 4 symbol lengths starting from the symbol immediately after the first TTI, and a third TTI configured by 4 symbol lengths starting from a symbol immediately after the second TTI; and (4) the plurality of TTIs are configured to include the first TTI configured by 4 symbol lengths starting from a symbol number 3 of the first slot in one subframe of the existing system, the second TTI configured by 3 symbol lengths starting from the symbol immediately after the first TTI, and the third TTI configured by 4 symbol lengths starting from the symbol immediately after the second TTI.

Note that the respective embodiments of the present invention may be applied, without being limited to these configurations, to any configurations in which the plurality of TTIs are specified by dividing one subframe of the existing system.

FIG. 5 is a diagram illustrating one example of the radio resource mapping of the TTI configuration in the first embodiment. FIG. 5 depicts symbols (14 symbols) corresponding to one subframe of the existing system with respect to such a band (3 resource blocks (PRB: Physical Resource Block)) wherein the shortened TTIs are set in a predetermined UE (User Equipment). The TTI configuration in FIG. 5 corresponds to the foregoing configuration (4).

Figure 5B:
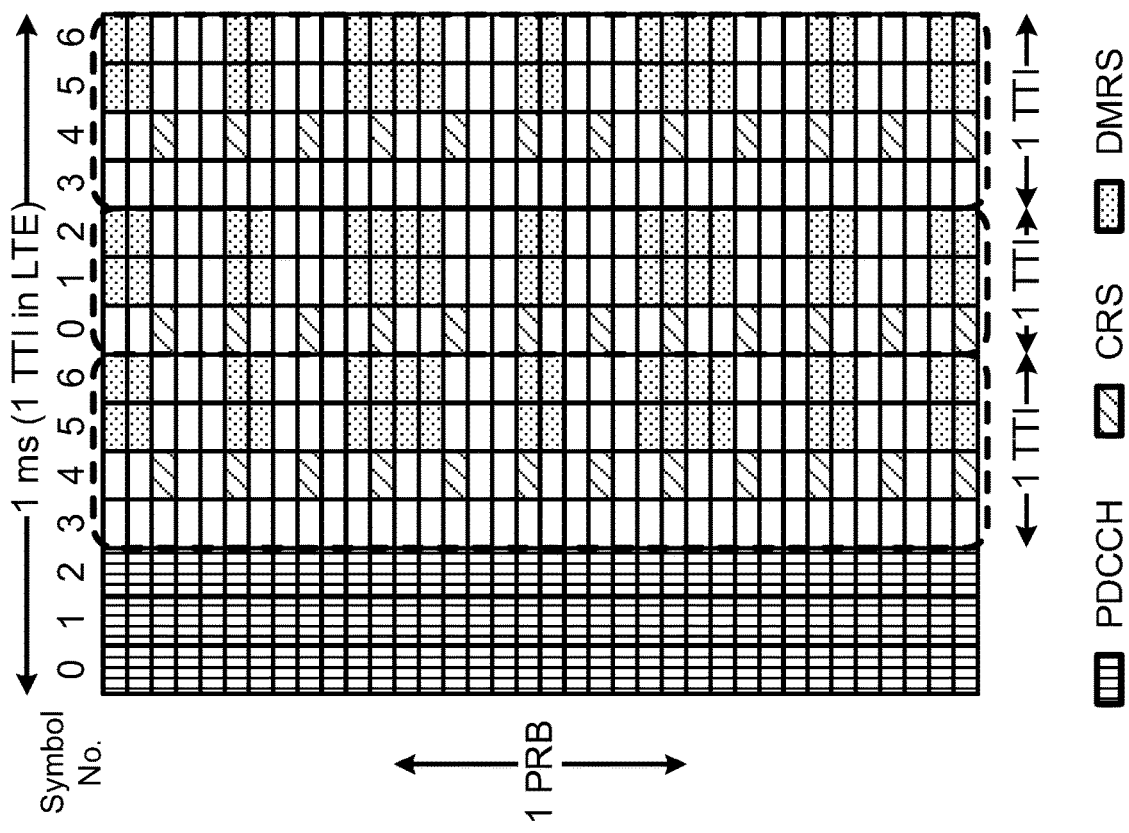
FIG. 5B is a diagram illustrating another example of the radio resource mapping of the TTI configuration in the first embodiment.

Note that unillustrated frequency resources may be used for setting the shortened TTIs for other UEs and may also be used in the normal TTIs. FIG. 6, which will be given later on, also illustrates the radio resource mapping in a region defined by the same 3 PRX×14 symbols as those in FIG. 5.

The resource mapping according to the present invention is not, however, limited to these examples.

A flow till the shortened TTIs are set in the UE is given, e.g., as follows. First, the UE transmits, to the eNB, UE capability information (UE Capability) representing that the UE is communication-enabled at the shortened TTI and/or the UE capability information representing that the UE has a delay decreasing function. The eNB receiving the UE capability information notifies the UE of information on the shortened TTI configuration (e.g., a start symbol, a symbol count, a PRB count and other equivalent items of the shortened TTI) on the basis of higher-layer signaling (e.g., RRC (Radio Resource Control) signaling) and downlink control information or a combination thereof. The UE specifies the TTI configuration on the basis of the notified information, and determines a radio resource by which the communication is to be performed at the shortened TTIs based on the TTI configuration, thereby controlling a transmission process and/or a reception process.

Specifying the TTI configuration (a shortened TTI configuration) encompasses specifying, e.g., time resources (a time length and other equivalent elements) and frequency resources (PRB and other equivalent elements) of the respective shortened TTIs, and specifying a signal configuration of the signal transmitted at each shortened TTI. Note that this flow may also be used in the same way in other embodiments.

The UE may receive scheduling information (e.g., a DL grant and a UL grant) of data transmitted and/or received at, at least, one of the plural TTIs via the same PDCCH as that of the existing system, and may also receive the scheduling information at any one (e.g., a first TTI) of the TTIs via an EPDCCH (Enhanced Physical Downlink Control Channel). The UE may further receive the data at, at least, one of the plural TTIs via a downlink shared channel (PDSCH: Physical Downlink Shared Channel) on the basis of the received DL grant. The UE may still further receive the data at, at least, one of the plural TTIs via an uplink shared channel (PUSCH: Physical Uplink Shared Channel) on the basis of the received UL grant.

Figure 5A:
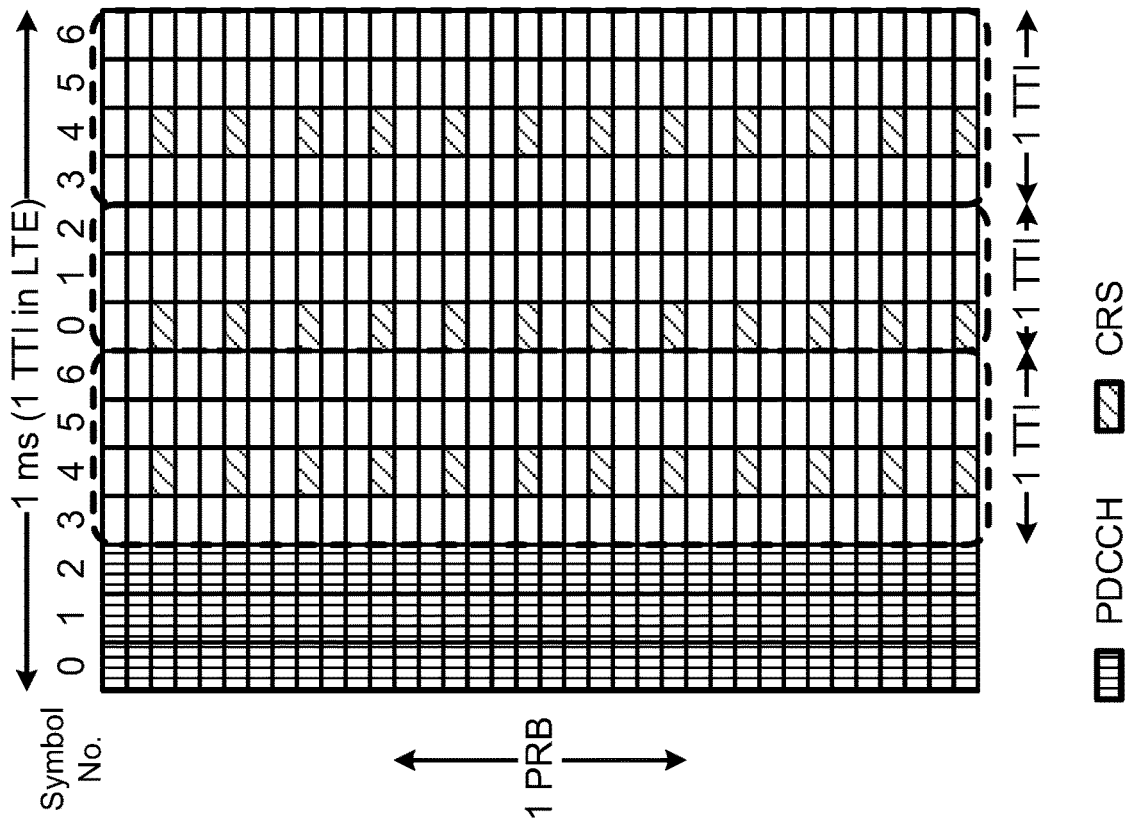
FIG. 5A is a diagram illustrating one example of radio resource mapping of a TTI configuration in a first embodiment.
Figure 6:
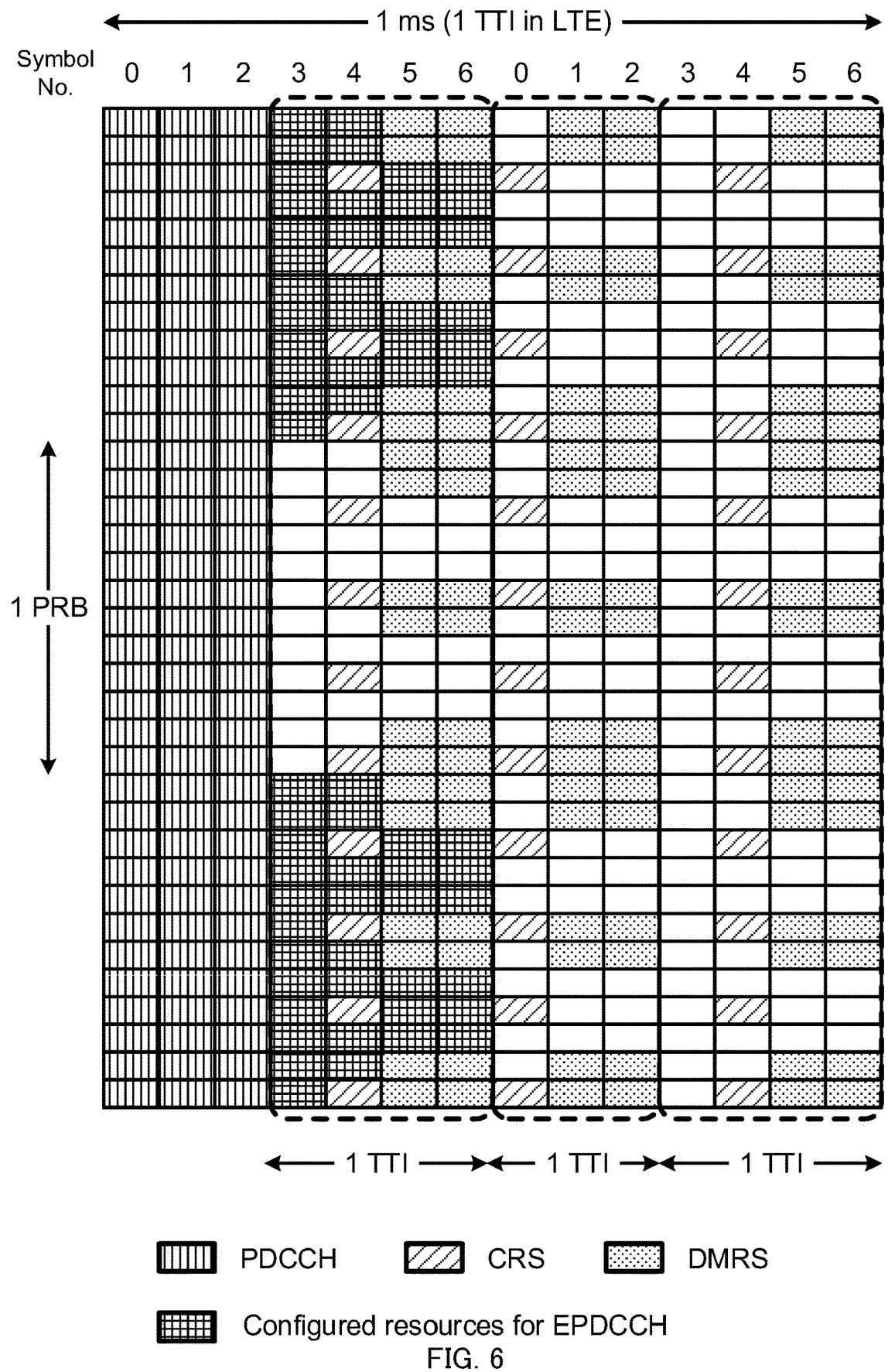
FIG. 6 is a diagram illustrating one example of scheduling based on EPDCCH in the first embodiment.

The first embodiment uses, as illustrated in FIG. 5A, the resource mapping of the same PDCCH region and CRS as those of the existing system. In this case, the resource mapping is done so that the UE receives the CRS at each TTI. This CRS is generated preferably from the same line as that of the CRS of the existing system, and may also be generated from a different line. The same is applied to the CRS described later in FIG. 6.

A demodulation reference signal (DMRS: Demodulation Reference Signal) is mapped for demodulating the data in, e.g., transmission mode (TM: Transmission Mode) 9 or 10 on the UE. The first embodiment may use, as illustrated in FIG. 5B, the resource mapping of the DMRS, of which at least part is the same as that of the existing system. In the example of FIG. 5B, the resource mapping of the same DMRS as that of the existing system is used at, at least, two (the first and third TTIs) of the plural TTIs. The UE is thereby enabled to execute the reception process by applying rate matching similar to the matching of the existing system at part of TTIs.

This DMRS is generated preferably from the same line as that of the DMRS of the existing system, and may also be generated from a different line. The same is applied to the DMRS described later in FIG. 6. Note that the DMRS may not be mapped depending on, e.g., a transmission mode.

The radio resource mapping of the shortened TTIs according to the present invention discussed so far enables the UE to execute the reception signal and sounding (quality testing) by employing part of the control signals and the reference signals of the existing system, whereby the shortened TTIs can be attained. The CRS is configured to be contained in each TTI, whereby channel estimation can be conducted at each TTI.

More specific contents of the scheduling information will hereinafter be described. When giving notification of the scheduling information via the existing PDCCH, the UE receives an explicit setting (the UE is explicitly notified) of information (which may be called TTI specifying information and a TTI index) for specifying the TTIs corresponding to a number (a division count) of the shortened TTIs selectable as scheduling target TTIs. To be specific, the downlink control information (e.g., DCI (Downlink Control Information)) containing the TTI specifying information is notified via the PDCCH.

The UE can determine the TTIs to be scheduled (scheduled TTIs) on the basis of the TTI specifying information. For example, in the example of FIG. 5, a shortened TTI count within one subframe is "3", and hence the individual TTIs can be scheduled in a way that causes the DCI (DL grant) to contain 2-bit TTI specifying information.

Alternatively, when there is a field that can be shared (can be set in common) among the plural TTIs, Joint DCI (the DCI sharing a predetermined field of resource allocation information and other equivalent information with the TTIs) may also be used. In the example of FIG. 5, the shortened TTI count within one subframe is "3", and therefore the plurality of TTIs can be batchwise scheduled by causing the DCI (DL grant) to contain 3-bit TTI (bitmap) specifying information. For example, in the TTI specifying information, the UE may determine that the TTI corresponding to "1" is allocatable, while the TTI corresponding to "0" is non-allocatable.

Also, when giving the notification of the scheduling information via the EPDCCH at the first shortened TTI within one subframe of the existing system, it is feasible to use the same TTI specifying information as in the above-mentioned case of the PDCCH. In the case of FIG. 5, the scheduling for the second and/or the third TTI counted from the first TTI may be called "cross TTI scheduling".

However, when transmitted via the EPDCCH at the shortened TTI, the time resource is less than the normal TTI, and hence such a necessity arises as to ensure the resources (a frequency band, a bandwidth) in a frequency direction. Therefore, such a scheme may be taken as to set (configure) the radio resources more than (expanded from) the existing EPDCCH resources. For example, the frequency resources of the existing EPDCCH involve using 2, 4 or 8 PRBs (Physical Resource Blocks), and there may be, however, taken a scheme of setting the resources (e.g., 6, 12 or 24 PRBs) obtained by multiplying these resources (2, 4 or 8 PRBs) by a given number (e.g., the division count ("3" in the case of FIG. 5) and a value obtained by dividing a maximum symbol count of the existing EPDCCH by a given shortened TTI symbol count). In other words, the eNB and/or the UE may be used by changing the wording to increase an existing radio resource quantity with respect to allocation of the EPDCCH to the UE with the shortened TTIs being set.

FIG. 6 is a diagram illustrating one example of the scheduling based on the EPDCCH in the first embodiment. The TTI configuration in FIG. 6 corresponds to the foregoing configuration (4) in the same way as in FIG. 5. FIG. 6 illustrates an example of allocating the scheduling information to the first TTI by using an EPDCCH resource set by the higher-layer signaling (e.g., RRC signaling).

There is a high possibility that it becomes difficult to frequency-multiplex the downlink shared channel (PDSCH: Physical Downlink Shared Channel) at the shortened TTIs with the EPDCCH being allocated. Hence, when notifying the EPDCCH at the first TTI to the UE with the shortened TTIs being set, it is preferable to allocate all the resources set in the UE concerned to the EPDCCH at the first TTI. In this case, it may be sufficient that the TTI specifying information is defined to enable the TTIs exclusive of the first TTI to be specified, and is used for specifying the TTIs, a number of which is given by subtracting "1" from the division count (=Division Count−1). Note that the allocation may be conducted so that the EPDCCH and the PDSCH are (can be) frequency-multiplexed at the first TTI as illustrated in FIG. 6.

Note that the UE can be notified of the specifying information in part or whole of the given field of the DCI (Downlink Control Information). For example, the specifying information concerned may be informed by using a new bit field not defined in a conventional LTE/LTE-A system, and may also be informed by changing the wording of an existing DCI bit field. The existing bit field is exemplified by a resource allocation (RA: Resource Allocation) field, an MCS (Modulation and Coding Scheme) field and an HPN (HARQ Process Number) field, and any of these fields or a combination thereof may be employed. Note that other fields instanced by CIF (Carrier Indicator Field) may be used by changing the wording.

For example, the shortened TTI has a small number of usable resources, and it is therefore considered that part of the MCSs (e.g., relatively high Modulation and Coding Schemes) in the existing system are not selected. Part or all of the MCS field of the existing system can be therefore used as the specifying information.

Note that the UE may be notified of information about which field of the DCI indicates the TTI specifying information by the higher-layer signaling (e.g., RRC signaling, broadcast information) and other equivalent signaling methods.

Note that a TTI count (a number of TTIs) within the subframe may be different per subframe (e.g., per type of the subframe) of the existing system. For instance, the MBSFN subframe may be configured to include 12 TTIs, while a non-MBSFN subframe may be configured to include the shortened TTIs equivalent to 8 TTIs. The TTI count may similarly be variable based on the subframe in other embodiments.

The use of the shortened TTI may involve increasing or decreasing an HARQ buffer count "8" (or a maximum HARQ buffer count "16" in TDD (Time Division Duplex)) in normal FDD (Frequency Division Duplex). For example, when assuming an example of using the shortened TTI in the FDD, the HARQ buffer count may be given by multiplying the division count by RTT (Round Trip Time) (HARQ Buffer Count=Division Count×RTT). In the example of FIG. 5, if "3" is the division count and, e.g., 4 ms is the RTT, the HARQ buffer count is calculated at "12".

Other control signals (e.g., PHICH (Physical Hybrid-ARQ Indicator Channel)) may be controlled by being associated with the TTI specifying information (TTI index). For example, an offset may be given to a predetermined signal resource (the frequency resource and/or the time resource), based on the TTI index.

As discussed above, the first embodiment enables the scheduling to be performed even when using the shortened TTIs by dividing one subframe into a plurality of TTIs and notifying the UE of the information specifying the TTIs to be scheduled via the physical downlink control channel (PDCCH/EPDCCH). The UE can execute the reception process and the sounding by using part of the control signals and the reference signals of the existing system, whereby the shortened TTIs can be attained.

Second Embodiment

A second embodiment of the present invention pertains to a decoding method of the physical downlink shared channel (PDSCH) for the transmission at the shortened TTI.

As described in the first embodiment, the UE receives the PDSCH at the shortened TTI on the basis of the received downlink control information (e.g., the DCI). The discussion will start with an existing decoding method of the PDSCH.

The UE acquires the MCS (Modulation and Coding Scheme) from the received DCI, and further acquires a TBS (Transport Block Size) associated with a TBS index corresponding to the MCS index and with a PRB count allocated to the PDSCH from a TBS table containing the TBS index, the PRB count and the TBS that are associated with each other. The UE decodes the PDSCH, based on the acquired TBS.

The present inventors focused on a point that the existing TBS table can support the PRB count allocatable to the PDSCH at the normal TTIs, but the TBS is not suitable for the shortened TTIs. Consequently, a direct use of the existing decoding method of the PDSCH prevents the PDSCH from being properly decoded.

Such being the case, the present inventors conceived an idea of performing the decoding that takes into account receiving the data at the shortened TTI when the UE receives the data at the shortened TTI. To be specific, the present inventors discovered the following two methods, i.e., a method (1) of using a table (by changing the wording) different from the existing TBS table, and a method (2) of making the direct use of the existing TBS table but changing an interpretation of the PRB count of the PRBs allocated to the PDSCH.

A description of the method (1) will be made. FIG. 7 is a diagram illustrating one examples of the existing TBS table and the TBS table according to the method (1) of the second embodiment. Note that FIG. 7 depicts only entries of values "91-100" of PRB count ($N_{PRB}$), but the same definition of the TBS (Transport Block Size) is, however, also applied to values "1-90" of PRB count ($N_{PRB}$). Note that the PRB count ($N_{PRB}$) is not limited to the values "1-100". FIG. 7 also illustrates only "25" and "26" as TBS indexes ($I_{TBS}$), but the definition of the TBS per PRB count is, however, also applied to other TBS indexes (e.g., 1-24, 28-33).

FIG. 7A is a diagram illustrating part of the existing TBS table, and FIG. 7B is a diagram illustrating part of the TBS table according to the method (1) of the second embodiment. The TBS indicated in the TBS table depicted in FIG. 7A is equivalent to the TBS corresponding to the PDSCH allocatable in one subframe of the existing system. With the same value being used for the shortened TTI, it therefore follows that the UE performs decoding on the assumption of excessive resources not actually allocated.

The method (1) involves using a table in which each TBS in the existing TBS table is replaced with the TBS having a much lower value. For example, FIG. 7B illustrates the table in which values of the respective TBSs in FIG. 7A are replaced with values as small as about one third. The values after being replaced are preferably the TBSs contained in the existing TBS table, but the embodiment is not limited to this scheme. Only part of the TBSs of the TBS table in FIG. 7A may also be replaced.

For example, in the TTI configurations (3) and (4) according to the first embodiment, a coding rate is calculated by using the TBS table in FIG. 7B, and the PDSCH in the shortened TTI may also be decoded.

Note that the TBS table for the shortened TTI as in FIG. 7B may be previously stored (set) in the UE, and may also be notified to the UE from the eNB by the higher-layer signaling (e.g., the RRC signaling, the broadcast information). The TBSs may further be converted from the existing TBS table by a predetermined calculation formula.

The use of the TBS table for the shortened TTI in the shortened TTI may be indicated by the higher-layer signaling. For example, indication information (which may be notated by, e.g., altTBS) indicating the use of the TBS table (as in, e.g., FIG. 7B) for the shortened TTI separately from the existing TBS table (as in, e.g., FIG. 7A) may be contained in the higher-layer control information (e.g., PDSCH-Config).

When the indication information (e.g., altTBS) is contained in the higher-layer control information (e.g., PDSCH-Config), the UE may acquire (apply) the TBSs for calculating the coding rate of the shortened TTI by employing the TBS table different from the existing TBS table, whereas when the indication information (e.g., altTBS) is not contained in the higher-layer control information (e.g., PDSCH-Config), the UE may acquire the TBSs from the existing TBS table.

In the method (2), the UE acquires the TBSs associated with the TBS indexes and the values given by multiplying the PRB count by a predetermined coefficient from the TBS table. For example, the UE may calculate a value (i.e., the PRB count ($N_{PRB}$) for referring to the TBS table) by multiplying a PRB count ($N'_{RB}$) allocated to the PDSCH by a predetermined coefficient α in the following equation (1).

$$N_{PRB} = \max\{\lfloor N'_{PRB} \times \alpha \rfloor, 1\} \quad \text{[Equation 1]}$$

For instance, in the TTI configurations (3) and (4) according to the first embodiment, the UE calculates the PRB count ($N_{PRB}$) for referring to the TBS table from the PRB count ($N'_{PRB}$) allocated to the PDSCH when α=0.33, and further calculates the coding rate by use of the TBS table in FIG. 7A, and may thus decode the PDSCH in the shortened TTI.

Note that the coefficient α may be stored beforehand (set) in the UE, and may also be notified to the UE from the eNB by the higher-layer signaling (e.g., the RRC signaling, the broadcast information). Correction of the PRB count in the shortened TTI is not limited to the equation 1, but may involve using a value given by dividing the PRB count allocated to the PDSCH by a predetermined coefficient.

For example, the higher-layer control information (e.g., PDSCH-Config) may contain the predetermined coefficient (which may be called, e.g., nPRB-Coeff) for the UE with the shortened TTI being set.

The UE may acquire the TBSs from the existing TBS table on the basis of the PRB count multiplied by the predetermined coefficient in the calculation of the coding rate of the shortened TTI when the predetermined coefficient (e.g., nPRB-Coeff) is contained in the higher-layer control information (e.g., PDSCH-Config).

As discussed so far, according to the second embodiment, when the physical downlink shared channel (PDSCH) is transmitted at the shortened TTI, a TBS taking the smaller value than by using the existing TBS table is acquired. The UE is thereby able to properly receive and/or decode the PDSCH at the shortened TTI.

Note that the respective embodiments have already described the downlink TTI configurations (the frame configuration, the channel configuration), but the shortened TTIs, into which one subframe of the existing system is divided, may, however, also be used on the uplink. In this case, the shortened TTI count (the division count) in one subframe in the existing system may be the same as or may also be different from the TTI count of the downlink frame.

Wireless Communication System

An architecture of a wireless communication system according to one embodiment of the present invention will hereinafter be described. This wireless communication system performs communications by using any of the wireless communication methods or a combination thereof according to the respective embodiments of the present invention.

Figure 8:
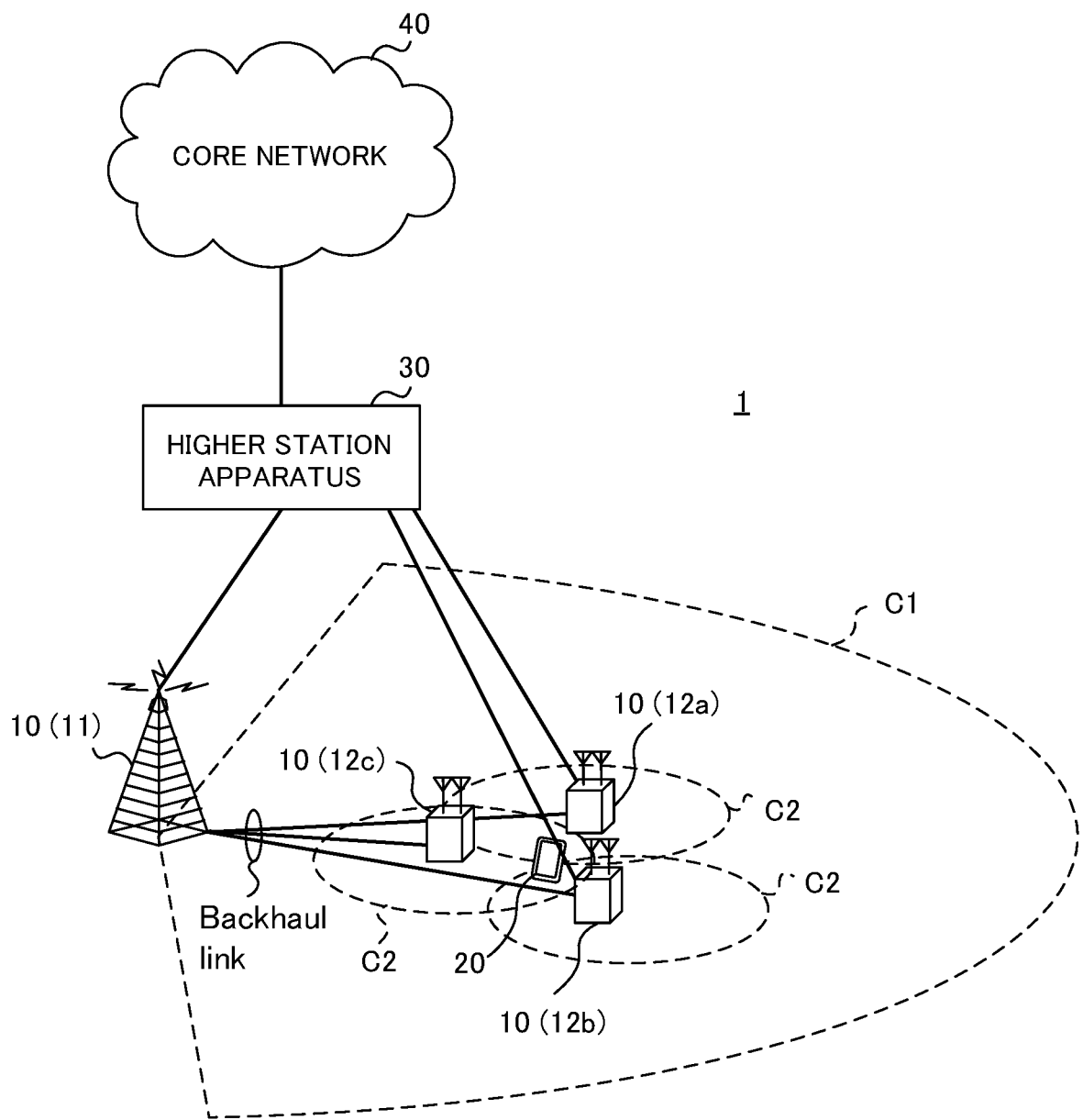
FIG. 8 is a view schematically illustrating an architecture of a wireless communication system according to one embodiment of the present invention.

FIG. 8 is a schematic view illustrating the architecture of the wireless communication system according to the embodiment. The carrier aggregation (CA) configured by aggregating a plurality of fundamental frequency blocks (component carriers) with one unitary parameter being a system bandwidth (e.g., 20 MHz) of an LTE system and/or dual connectivity (DC) can be applied to a wireless communication system 1.

Note that the wireless communication system 1 may also be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), and New-RAT (Radio Access Technology), and may also be called a system for attaining these technologies.

The wireless communication system 1 illustrated in FIG. 8 includes a wireless base station 11 configuring a macro cell C1 having a relatively broad coverage, and wireless base stations 12 (12a-12c) configuring small cells C2, each smaller than the macro cell C1. User equipment 20 is disposed in the macro cell C1 and the respective small cells C2.

The user equipment 20 is connectable to both of the wireless base station 11 and the wireless base station 12. It is assumed that the user equipment 20 simultaneously uses the macro cell C1 and the small cell C2 through the CA or the DC. The user equipment 20 may apply the CA or the DC by employing the plural cells (CCs) (e.g., five or less CCs, six or more CCs).

The communications between the user equipment 20 and the wireless base station 11 can be performed by using a carrier (called an existing carrier and a Legacy carrier) having a narrow bandwidth in a relatively low frequency band (e.g., 2 GHz). While on the other hand, the communications between the user equipment 20 and the wireless base station 12 may involve using a carrier having a broad bandwidth in a relatively high frequency band (e.g., 3.5 GHz, 5 GHz), and may further involve using the same carrier as the carrier between the user equipment 20 and the wireless base station 11. Note that a configuration of the frequency band used by each wireless base station is not limited to these examples.

A configuration wherein the wireless base station 11 and the wireless base station 12 (alternatively, the two wireless base stations 12) are connected wiredly (using, e.g., an optical fiber conforming to a CPRI (Common Public Radio Interface), an X2 interface and other equivalent interfaces) or wirelessly can be used.

The wireless base station 11 and the wireless base stations 12 are connected respectively to a host station apparatus 30 and further connected to a core network 40 via the host station apparatus 30. Note that the host station apparatus 30 includes, e.g., an access gateway apparatus, a radio network controller (RNC) and a mobility management entity (MME), but the embodiment is not limited to these apparatuses. Each wireless base station 12 may be connected to the host station apparatus 30 via the wireless base station 11.

Note that the wireless base station 11 is a wireless base station having relatively broad coverage and may be called a macro base station, an aggregation node, an eNB (evolved NodeB) and a transmission/reception point. The wireless base station 12 is a wireless base station having a local coverage and may be called a small base station, a micro base station, a pico base station, a femto base station, an HeNB (Home eNodeB), an RRH (Remote Radio Head), and the transmission/reception point. The wireless base stations 11 and 12 will hereinafter be generically called wireless base stations 10 unless otherwise distinguished.

Each user equipment 20 is a terminal that supports a variety of communication methods instanced by the LTE and the LTE-A, and may encompass not only a mobile communication terminal but also a fixed communication terminal.

In the wireless communication system 1, OFDMA (Orthogonal Frequency Division Multiple Access) is applied as a wireless access method to the downlink, while SC-FDMA (Single Carrier FDMA) is applied as another wireless access method to the uplink. The OFDMA is defined as a multi carrier transmission method of performing the communications by dividing the frequency band into narrow frequency bands (subcarriers) and mapping the data to the subcarriers. The SC-FDMA is defined as a single carrier transmission method designed such that a system bandwidth is divided into plural bands formed by single or consecutive resource blocks on a per-terminal basis, and the plural terminals use the bands different from each other, thereby reducing interference between the terminals. Note that the uplink and downlink wireless access methods are not limited to the combination thereof.

The wireless communication system 1 involves using downlink channels instanced by a PDSCH (Physical Downlink Shared Channel), a PBCH (Physical Broadcast Channel) and a downlink L1/L2 control channel, which are shared among the user equipment 20. The user data, the higher-layer control information and a SIB (System Information Block) are transmitted via the PDSCH. An MIB (Master Information Block) is transmitted via the PBCH.

The downlink L1/L2 control channel includes downlink control channels instanced by a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel). The Downlink Control Information (DCI) containing the scheduling information of the PDSCH and the PUSCH is transmitted via the PDCCH. An OFDM symbol count used for the PDCCH is transmitted via the PCFICH. HARQ (Hybrid Automatic Repeat reQuest) acknowledgement information (which is also called, e.g., retransmission control information, HARQ-ACK, and ACK/NACK) for the PUSCH is transmitted via the PHICH. The EPDCCH is frequency-division-multiplexed with the PDSCH (Physical Downlink Shared Channel) and is used for transmitting the DCI in the same way as the PDCCH.

The wireless communication system 1 further involves using the uplink channels instanced by a PUSCH (Physical Uplink Shared Channel), a PUCCH (Physical Uplink Control Channel) and a PRACH (Physical Random Access Channel), which are shared among the user equipments 20. The user data and the higher-layer control information are transmitted via the PUSCH. Downlink wireless quality information (CQI (Channel Quality Indicator)) and the acknowledgement information are transmitted via the PUCCH. A random access preamble for establishing a connection with the cell is transmitted via the PRACH.

The wireless communication system 1 transmits a Cell-specific Reference Signal (CRS), a Channel State Information-Reference Signal (CSI-RS), a Demodulation Reference Signal (DMRS) and a Positioning Reference Signal (PRS) as downlink reference signals. The wireless communication system 1 also transmits a Sounding Reference Signal (SRS) and the Demodulation Reference Signal (DMRS) as uplink reference signals. Note that the DMRS may also be called a user equipment specific reference signal (UE-specific Reference Signal). The reference signals to be transmitted are not limited to these signals.

Wireless Base Station

Figure 9:
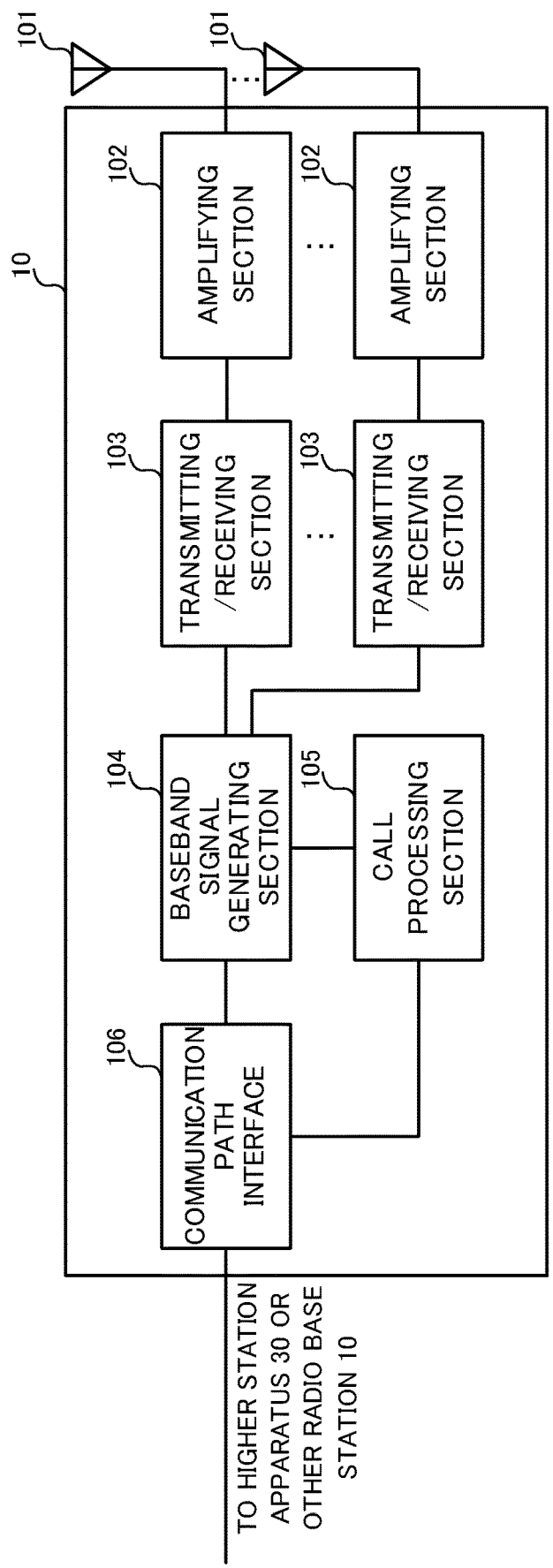
FIG. 9 is a diagram illustrating one example of a whole configuration of a wireless base station according to one embodiment.

FIG. 9 is a diagram illustrating one example of an overall configuration of a wireless base station according to one embodiment of the present invention. A wireless base station 10 includes a plurality of transmission/reception antennas 101, an amplifier unit 102, a transmission/reception unit 103, a baseband signal processor unit 104, a call processor unit 105, and a transmission path interface 106. It may be sufficient that the wireless base station 10 be configured to include one or more transmission/reception antennas 101, one or more amplifier units 102, and one or more transmission/reception units 103.

The user data transmitted to the user equipment 20 from the wireless base station 10 via the downlink is inputted to the baseband signal processor unit 104 from the host station apparatus 30 via the transmission path interface 106.

The baseband signal processor unit 104 is configured such that the user data is transferred to the transmission/reception unit 103 after undergoing transmission processes instanced by a PDCP (Packet Data Convergence Protocol) layer process, a user data segmenting/coupling process, an RLC (Radio Link Control) layer transmission process such as RLC retransmission control, MAC (Medium Access Control) retransmission control (e.g., an HARQ transmission process), scheduling, transmission format selection, channel coding, an IFFT (Inverse Fast Fourier Transform) process, and a pre-coding process. The downlink control signal is also transferred to the transmission/reception unit 103 after undergoing the transmission process instanced by the channel coding and the IFFT.

The transmission/reception unit 103 transmits a baseband signal pre-coded and outputted per antenna from the baseband signal processor unit 104 by converting this baseband signal into a radio frequency band. A radio frequency signal, which is frequency-converted by the transmission/reception unit 103, is amplified by the amplifier unit 102 and transmitted from the transmission/reception antenna 101. The transmission/reception unit 103 may be configured by a transmitter/receiver, a transmission/reception circuit or a transmission/reception device, which are described based on the common recognition in the technical field according to the present invention. Note that the transmission/reception unit 103 may be configured as the integral transmission/reception unit, and may also be configured to include the transmission unit and the reception unit.

On the other hand, the radio frequency signal, received by the transmission/reception antenna 101, of the uplink signal is amplified by the amplifier unit 102. The transmission/reception unit 103 receives the uplink signal amplified by the amplifier unit 102. The transmission/reception unit 103 performs the frequency conversion of the reception signal into the baseband signal, and outputs the baseband signal to the baseband signal processor unit 104.

The baseband signal processor unit 104 is configured such that the user data contained in the inputted uplink signal is transferred to the host station apparatus 30 via the transmission path interface 106 after undergoing an FFT (Fast Fourier Transform) process, an IDFT (Inverse Discrete Fourier Transform) process, error correction decoding, a MAC retransmission control reception process, and a PCL/PDCP layer reception process. The call processor unit 105 executes a call process, such as setting and releasing the communication channel, and manages a status of the wireless base station 10 and the radio resources.

The transmission path interface 106 transmits and receives the signal to and from the host station apparatus 30 via a certain interface. The transmission path interface 106 may also transmit and receive (backhaul signaling) the signal to and from another wireless base station 10 via an inter base station interface (e.g., the optical fiber and the X2 interface conforming to CPRI (Common Public Radio Interface)).

Note that the transmission/reception unit 103 transmits the downlink control information (e.g., the DCI) on the data transmission and/or the data reception to the user equipment 20. For example, the transmission/reception unit 103 may transmit an instruction information (DL grant) of receiving the physical downlink shared channel (PDSCH). The transmission/reception unit 103 may also transmit instruction information (UL grant) of transmitting the physical uplink shared channel (PUSCH).

The transmission/reception unit 103 transmits the downlink data (PDSCH) at a given shortened TTI decided (determined) by the control unit 301. The transmission/reception unit 103 may also transmit the HARQ-ACK with respect to the uplink data (PUSCH). The transmission/reception unit 103 may further transmit information on the shortened TTI configuration.

The transmission/reception unit 103 receives the uplink data at the physical uplink shared channel (e.g., the PUSCH) from the user equipment 20. The transmission/reception unit 103 may receive the HARQ-ACK with respect to the downlink data transmitted via the physical downlink shared channel (PDSCH), based on the DCI.

Figure 10:
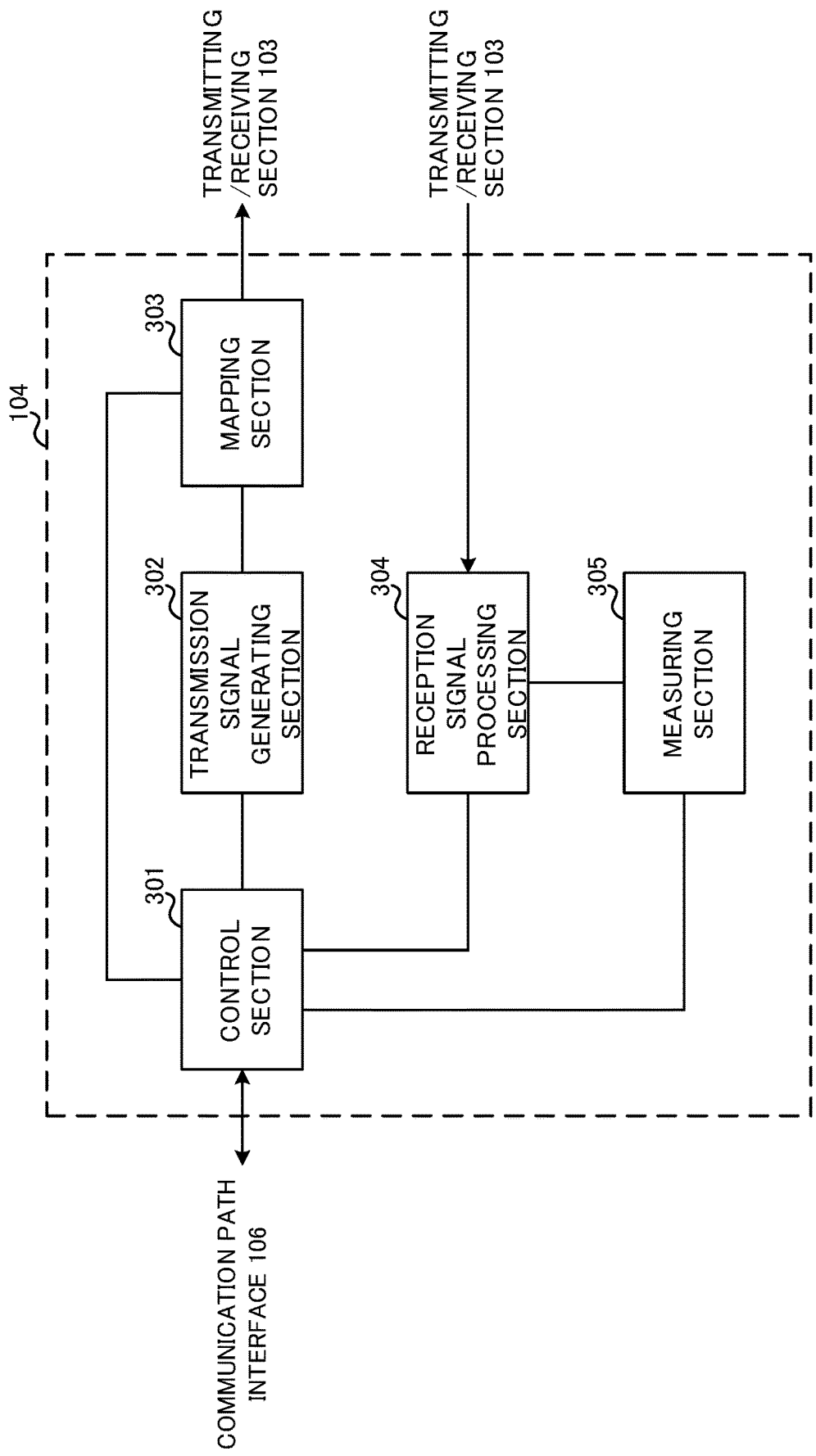
FIG. 10 is a diagram illustrating one example of a configuration of functions of the wireless base station according to one embodiment.

FIG. 10 is a diagram illustrating one example of a configuration of functions of the wireless base station according to the present embodiment. Note that FIG. 10 mainly illustrates function blocks of characteristic components of the present embodiment. However, the wireless base station 10 is to include other function blocks suitable for the wireless communications. As depicted in FIG. 10, the baseband signal processor unit 104 includes at least a control unit (scheduler) 301, a transmission signal generator unit (generation unit) 302, a mapping unit 303, a reception signal processor unit 304, and a sounding (quality testing) unit 305.

The control unit (scheduler) 301 controls the entire wireless base station 10. The control unit 301 may be configured by a controller, a control circuit or a control device, which are described based on the common recognition in the technical field according to the present invention.

The control unit 301 controls, e.g., signal generation of a transmission signal generator unit 302 and signal allocation of the mapping unit 303. The control unit 301 further controls a signal reception process of the reception signal processor unit 304 and signal sounding of the sounding unit 305.

The control unit 301 controls scheduling (e.g., resource allocation) of system information, the downlink data signal transmitted via the PDSCH, and the downlink control signal transmitted via the PDCCH and/or the EPDCCH. The control unit 301 also controls the scheduling of downlink reference signals instanced by synchronization signals (PSS (Primary Synchronization Signal)/SSS (Secondary Synchronization Signal)), the CRS, the CSI-RS and the DMRS.

The control unit 301 controls the scheduling of an uplink data signal transmitted via the PUSCH, an uplink control signal (e.g., the acknowledgement information) transmitted via the PUCCH and/or the PUSCH, a random access preamble transmitted via the PRACH, and an uplink reference signal.

The control unit 301 controls to transmit a variety of signals by using the shortened TTIs in at least downlink communications (downlink transmission). To be specific, the control unit 301 controls to transmit the data at, at least, one of the plural TTIs (each having a TTI length less than 1 ms) contained in one subframe of the existing system.

The control unit 301 may control to map the cell-specific reference signal to the radio resource (CRS resource), to which the cell-specific reference signal of the existing system is allocated, and to transmit the mapped cell-specific reference signal at each shortened TTI. The control unit 301 may also control to map the demodulation reference signal to the radio resource (DMRS resource), to which the demodulation reference signal (DMRS) of the existing system is allocated, and to transmit the mapped demodulation reference signal at, at least, one of the shortened TTIs. For example, the control unit 301 can control to allocate the control signal, the reference signal and the data signal, based on the radio resource mapping described in at least one of the TTI configurations (1)-(4) according to the first embodiment.

To take the TTI configuration (4) for example, the control unit 301 can utilize a downlink frame configuration using a first TTI configured to have a 4-symbol length starting from a symbol number 3 of a first slot, a second TTI configured to have a 3-symbol length starting from a symbol immediately after the first TTI, and a third TTI configured to have the 4-symbol length starting from the symbol immediately after the second TTI as the plurality of shortened TTIs contained in one subframe of the existing system.

Note that this frame configuration may be defined as a downlink frame configuration using the first TTI configured to have the 4-symbol length starting from the symbol number 3 of the first slot of one subframe of the existing system, the second TTI configured to have the 3-symbol length starting from a symbol number 0 of a second slot of one subframe of the existing system, and the third TTI configured to have the 4-symbol length starting from the symbol number 3 of the second slot of one subframe of the existing system as the plurality of shortened TTIs.

The frame configuration may further be defined as a downlink frame configuration using the first TTI configured to have a length of the symbol number 3 through a symbol number 6 of the first slot of one subframe of the existing system, the second TTI configured to have a length of the symbol number through the symbol number 2 of the second slot of one subframe of the existing system, and the third TTI configured to have a length of the symbol number 3 through the symbol number 6 of the second slot of one subframe of the existing system as the plurality of shortened TTIs. The same change of wording may be applied to other TTI configurations (the frame configurations).

The control unit 301 may control the mapping so that in the frame configured by the 3 TTIs having the 4-symbol length as in the TTI configuration (3), the first TTI contains the last symbol when including the demodulation reference signal, the second TTI contains not the first symbol, but the two symbols counted from the last when including the demodulation reference signal, and the third TTI contains the two symbols counted from the last when including the demodulation reference signal.

The control unit 301 controls to apply rate matching (or puncturing) taking account of the first symbol to the first TTI data when allocating the first symbol of the first TTI to the physical downlink control channel (PDCCH) in the frame configured by the 3 TTIs having the 4-symbol length as in, e.g., the TTI configuration (3).

The control unit 301 may also control the mapping so that each of the first TTI, the second TTI and the third TTI contains the two symbols counted from the last when including the demodulation reference signal in the frame configured by the TTI having the 4-symbol length, the TTI having the 3-symbol length and the TTI having the 4-symbol length as in the TTI configuration (4).

The control unit 301 controls to transmit the downlink control information (the scheduling information) for scheduling at least one of the shortened TTIs to the user equipment 20 via the PDCCH region of the existing system and/or via the EPDCCH at the head shortened TTI of each subframe. The control unit 301 controls to notify the user equipment 20 of the scheduling information inclusive of information (which may be called TTI specifying information and TTI indexes) for specifying the TTIs corresponding to the number (the division count) of the shortened TTIs selectable as scheduling target TTIs.

The control unit 301 may control to notify a given user equipment 20 of the information (e.g., the start symbol, the symbol count, the PRB count and other equivalent items of the shortened TTI) about the shortened TTI configuration on the basis of the higher-layer signaling (e.g., the RRC signaling) and the downlink control information or the combination thereof. For example, the control unit 301 may also control to make the notification of information about an associative relation between the shortened TTI configurations and the predetermined indexes (the TTI configuration indexes) by the higher-layer signaling, and to make the notification of the TTI configuration indexes corresponding to the TTI configurations of the subframe through the DCI via the PDCCH region of each subframe.

The transmission signal generator unit 302 generates, based on an instruction given from the control unit 301, the downlink signals (the downlink control signal, the downlink data signal, and the downlink reference signal), and outputs the generated downlink signals to the mapping unit 303. The transmission signal generator unit 302 can be configured by a signal generator, a signal generation circuit or a signal generation device, which are described based on the common recognition in the technical field according to the present invention.

The transmission signal generator unit 302 generates, based on, e.g., the instruction given from the control unit 301, a DL assignment for the notification of downlink signal allocation information, and an UL grant for the notification of uplink signal allocation information. The downlink data signal undergoes a coding process and a modulation process in accordance with the coding rate and a modulation method, which are determined based on CSI (Channel State Information) and other equivalent information given from the individual user equipment 20.

The mapping unit 303 maps, based on the instruction given from the control unit 301, the downlink signal generated by the transmission signal generator unit 302 to a predetermine radio source, and outputs the mapped downlink signal to the transmission/reception unit 103. The mapping unit 303 can be configured by a mapper, a mapping circuit or a mapping device, which are described based on the common recognition in the technical field according to the present invention.

The reception signal processor unit 304 executes the reception process (such as de-mapping, demodulation and decoding) for the reception signal inputted from the transmission/reception unit 103. The reception signal is exemplified by the uplink signal (the uplink control signal, the uplink data signal, the uplink reference signal) transmitted from the user equipment 20. The reception signal processor unit 304 can be configured by a signal processor, a signal processor circuit or a signal processor device, which are described based on the common recognition in the technical field according to the present invention.

The reception signal processor unit 304 outputs information decoded by the reception process to the control unit 301. For example, the reception signal processor unit 304, when receiving the PUCCH containing the HARQ-ACK, outputs the HARQ-ACK to the control unit 301. The reception signal processor unit 304 outputs the reception signal and a post-reception-processing signal to the sounding unit 305.

The sounding unit 305 performs sounding (quality testing) with respect to the received signal. The sounding unit 305 can be configured by a sounding instrument, a sounding circuit or a sounding device, which are described based on the common recognition in the technical field according to the present invention.

The sounding unit 305 may also estimate reception power (e.g., RSRP (Reference Signal Received Power)), a reception quality (e.g., RSRQ (Reference Signal Received Quality)) and a channel state of the received signal. An estimation result may be outputted to the control unit 301.

User Equipment

Figure 11:
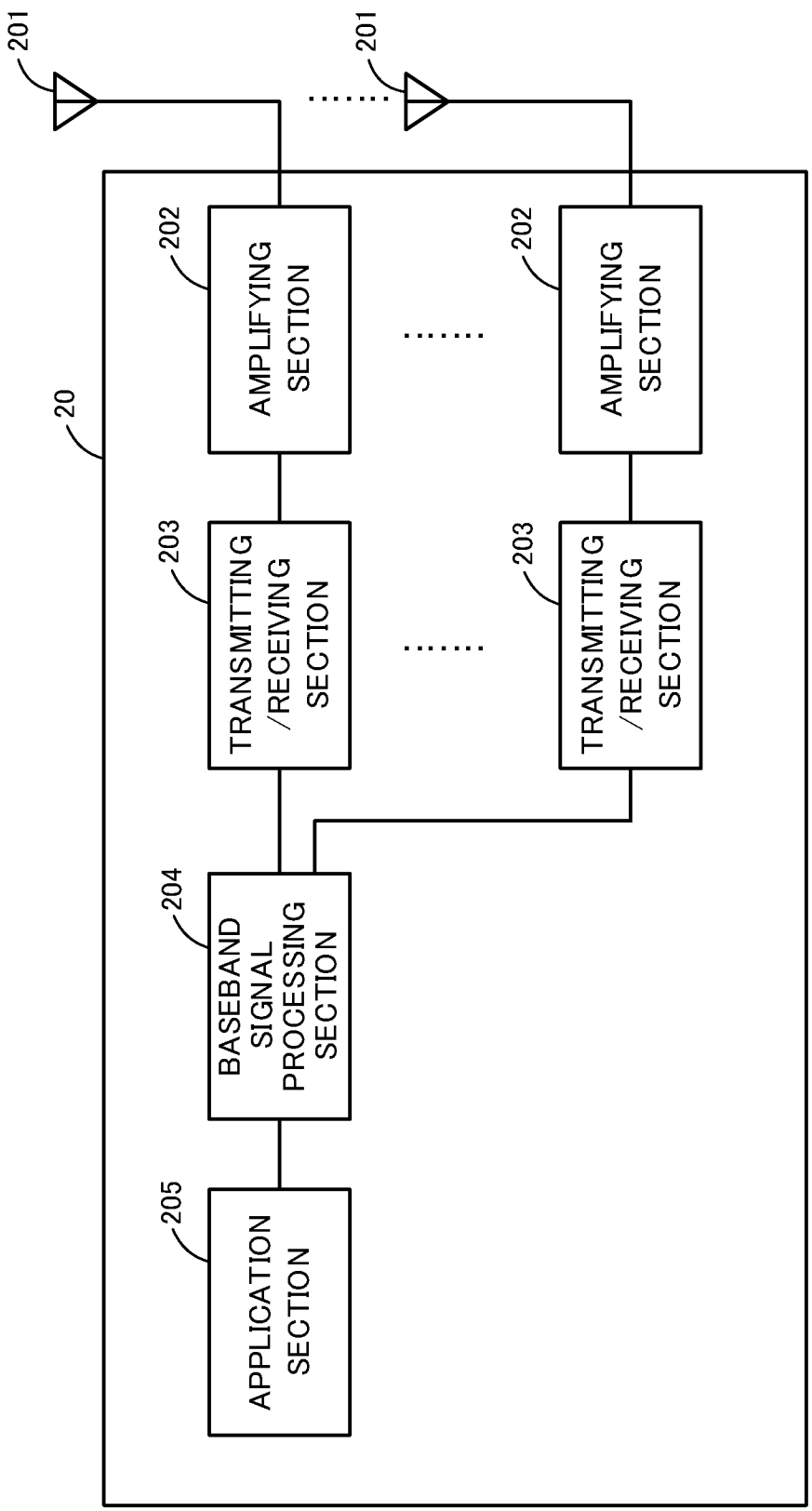
FIG. 11 is a diagram illustrating one example of a whole configuration of a user equipment according to one embodiment.

FIG. 11 is a diagram illustrating one example of an overall configuration of the user equipment according to one embodiment of the present invention. The user equipment 20 includes plural transmission/reception antennas 201, an amplifier unit 202, a transmission/reception unit 203, a baseband signal processor unit 204, and an application unit 205. It may be sufficient that the wireless base station 10 is configured to include one or more transmission/reception antennas 201, one or more amplifier units 202, and one or more transmission/reception units 203.

The radio frequency signal received by the transmission/reception antenna 201 is amplified by the amplifier unit 202. The transmission/reception unit 203 receives the downlink signal amplified by the amplifier unit 202. The transmission/reception unit 203 performs the frequency conversion of the reception signal into the baseband signal, and outputs the baseband signal to the baseband signal processor unit 204. The transmission/reception unit 203 can be configured by a transmitter/receiver, a transmission/reception circuit or a transmission/reception device, which are described based on the common recognition in the technical field according to the present invention. Note that the transmission/reception unit 203 may be configured as an integral transmission/reception unit 203, and may also be configured to include the transmission unit and the reception unit.

The baseband signal processor unit 204 executes the FFT process, the error correction decoding and the retransmission control reception process with respect to the inputted baseband signal. The downlink user data is transferred to the application unit 205. The application unit 205 executes processes about higher layers than a physical layer and the MAC layer. Of the downlink data, broadcast information is also transferred to the application unit 205.

On the other hand, the uplink user data is inputted to the baseband signal processor unit 204 from the application unit 205. The baseband signal is transferred to each transmission/reception unit 203 after undergoing a retransmission control transmission process (e.g., an HARQ transmission process), channel coding, pre-coding, a Discrete Fourier Transform (DFT) process and an IFFT process in the baseband signal processor unit 204. The transmission/reception unit 203 converts the baseband signal outputted from the baseband signal processor unit 204 into the radio frequency band, and thus transmits the radio frequency signal. The radio frequency signal being frequency-converted by the transmission/reception unit 203 is amplified by the amplifier unit 202 and transmitted from the transmission/reception antenna 201.

The transmission/reception unit 203 transmits the uplink data via the physical uplink shared channel (e.g., the PUSCH) to the wireless base station 10. The transmission/reception unit 203 may transmit the HARQ-ACK with respect to the downlink data transmitted via the physical downlink shared channel (the PDSCH) based on the DCI.

The transmission/reception unit 203 receives the downlink control information (e.g., the DCI) about the data transmission and/or the data reception from the wireless base station 10. For example, the transmission/reception unit 203 may receive the instruction information (DL grant) of receiving the physical downlink shared channel (PDSCH). The transmission/reception unit 203 may also receive the instruction information (UL grant) of transmitting the physical uplink shared channel (PUSCH).

The transmission/reception unit 203 receives the downlink data (PDSCH) at a given shortened TTI decided (determined) by the control unit 401. The transmission/reception unit 203 may also transmit the HARQ-ACK with respect to the uplink data (PUSCH). The transmission/reception unit 203 may also receive the information on the shortened TTI configuration.

Figure 12:
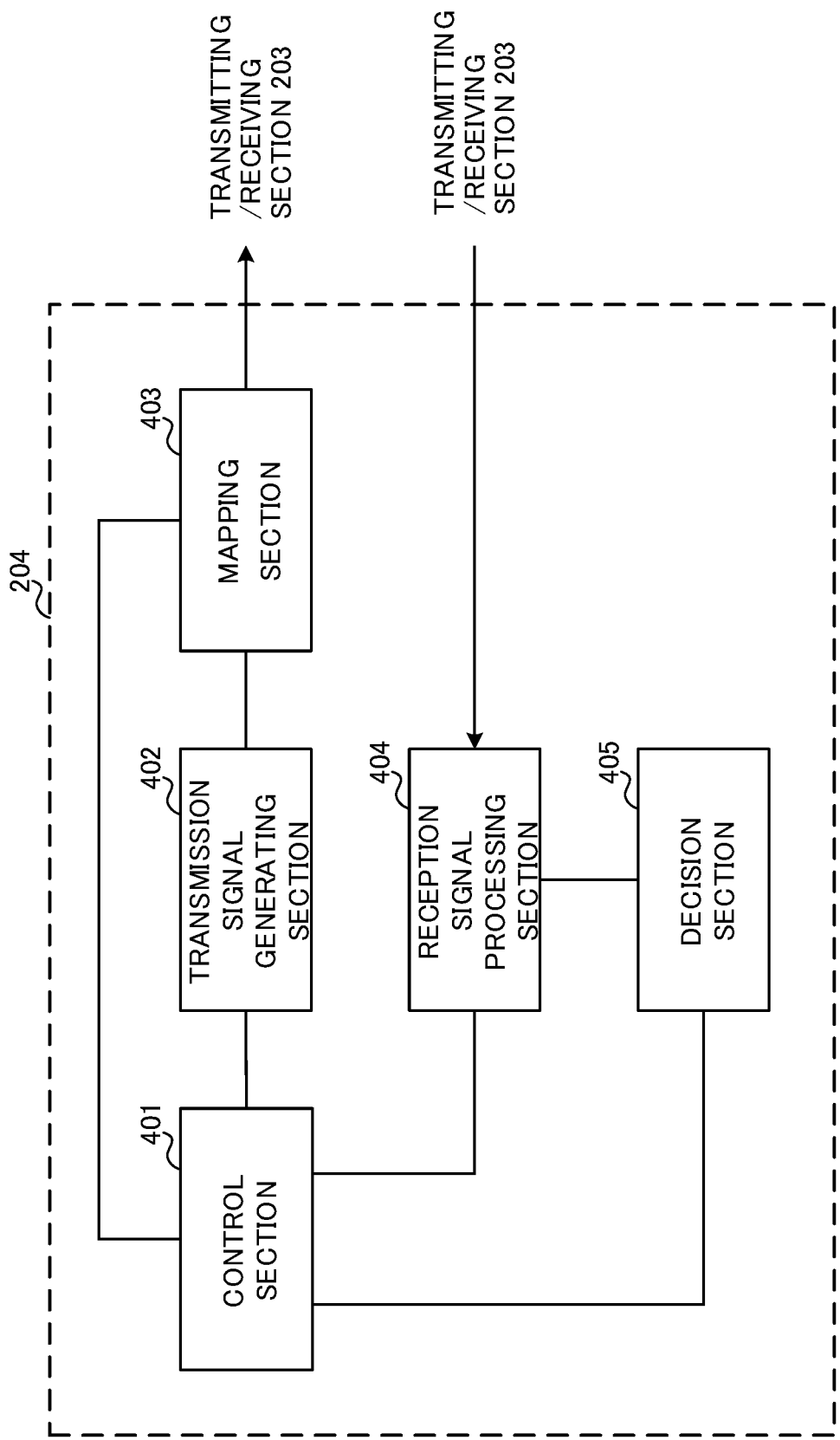
FIG. 12 is a diagram illustrating one example of a configuration of functions of the user equipment according to one embodiment.

FIG. 12 is a diagram illustrating one example of a configuration of functions of the user equipment according to one embodiment of the present invention. Note that FIG. 12 mainly illustrates function blocks of characteristic components of the present embodiment. However, the user equipment 20 can include other function blocks suitable for the wireless communications. As depicted in FIG. 12, the baseband signal processor unit 204 of the user equipment 20 includes at least a control unit 401, a transmission signal generator unit 402, a mapping unit 403, a reception signal processor unit 404, and a sounding unit 405.

The control unit 401 controls the overall user equipment 20. The control unit 401 can be configured by a controller, a control circuit or a control device, which are described based on the common recognition in the technical field according to the present invention.

The control unit 401 controls, e.g., the signal generation of the transmission signal generator unit 402 and the signal allocation of the mapping unit 403. The control unit 401 further controls the signal reception process of the reception signal processor unit 404 and the signal sounding of the sounding unit 405.

The control unit 401 acquires, from the reception signal processor unit 404, the downlink control signal (the signal transmitted via the PDCCH/EPDCCH) and the downlink data signal (the signal transmitted via the PDSCH), which are transmitted from the wireless base station 10. The control unit 401 controls the generation of the uplink control signal (e.g., the acknowledgement information) and the uplink data signal, based on a result of determining whether the downlink control signal and the downlink data signal entail the retransmission control or not.

The control unit 401 controls to receive the variety of signals by using the shortened TTIs in at least downlink communications (downlink transmission). To be specific, the control unit 401 controls to receive the data at, at least, one of the plural TTIs (each having the TTI length less than 1 ms) contained in one subframe of the existing system.

The control unit 401 may control to receive the cell-specific reference signal by the radio resource to which the cell-specific reference signal (CRS) of the existing system is allocated at each shortened TTI. The control unit 401 may also control to receive the demodulation reference signal by the radio resource to which the demodulation reference signal (DMRS) of the existing system is allocated at, at least, one of the shortened TTIs. For example, the control unit 401 can control to receive the control signal, the reference signal and the data signal, based on the radio resource mapping described in at least one of the TTI configurations (1)-(4) according to the first embodiment.

To take the TTI configuration (4) for example, the control unit 401 can control to execute the reception process on the assumption of the downlink frame configuration using the first TTI configured to have the 4-symbol length starting from the symbol number 3 of the first slot, the second TTI configured to have the 3-symbol length starting from the symbol immediately after the first TTI, and the third TTI configured to have the 4-symbol length starting from the symbol immediately after the second TTI as the plurality of shortened TTIs contained in one subframe of the existing system.

The control unit 401 may control to execute the reception process on the assumption that in the frame configured by the 3 TTIs having the 4-symbol length as in the TTI configuration (3), the first TTI contains the last symbol when including the demodulation reference signal, the second TTI contains not the first symbol but the two symbols counted from the last when including the demodulation reference signal, and the third TTI contains the two symbols counted from the last when including the demodulation reference signal.

The control unit 401 controls to execute the reception process by applying the rate matching that takes account of the first symbol to the first TTI data when allocating the first symbol of the first TTI to the physical downlink control channel (PDCCH) in the frame configured by the 3 TTIs having the 4-symbol length as in, e.g., the TTI configuration (3).

The control unit 401 may also control to execute the reception process on the assumption that each of the first TTI, the second TTI and the third TTI contains the two symbols counted from the last when including the demodulation reference signal in the frame configured by the TTI having the 4-symbol length, the TTI having the 3-symbol length and the TTI having the 4-symbol length as in the TTI configuration (4).

The control unit 401 controls to receive the downlink control information (the scheduling information) for scheduling at least one of the shortened TTIs via the PDCCH region of the existing system and/or via the EPDCCH at the head shortened TTI of each subframe. The control unit 401 controls to transmit and/or receive the data corresponding to the downlink control information (e.g., the DCI) acquired from the reception signal processor unit 404 at the given shortened TTI (scheduled TTI). The control unit 401 can specify (determine) the scheduled TTI, based on the TTI specifying information (the TTI index) contained in the scheduling information.

The control unit 401 may update, when acquiring the information about the shortened TTI configuration from the reception signal processor unit 404, parameters used for controlling the transmission and/or the reception using the shortened TTI on the basis of this acquired information.

The control unit 401 may, when receiving the data at the shortened TTI, control the reception signal processor unit 404 to execute a decoding process by referring to the TBS table containing smaller values of the TBSs than those of the TBS table used in the existing system. The control unit 401 may also, when receiving the data at the shortened TTI, control the reception signal processor unit 404 to execute the decoding process with reference to the existing TBS table in a way that uses a value given by multiplying the PRB count allocated to the data by a predetermined coefficient.

The transmission signal generator unit 402 generates, based on an instruction given from the control unit 401, the downlink signals (the downlink control signal, the downlink data signal, and the downlink reference signal), and outputs the generated downlink signals to the mapping unit 403. The transmission signal generator unit 402 can be configured by the signal generator, the signal generation circuit or the signal generation device, which are described based on the common recognition in the technical field according to the present invention.

The transmission signal generator unit 402 generates, based on, e.g., the instruction given from the control unit 401, the control signals about the acknowledgement information and the channel state information (CSI). The transmission signal generator unit 402 also generates the uplink data signal, based on the instruction given from the control unit 401. For example, the transmission signal generator unit 402 is instructed by the control unit 401 to generate the uplink data signal when the downlink control signal notified from the wireless base station 10 contains the UL grant.

The mapping unit 403 maps, based on the instruction given from the control unit 401, the uplink signal generated by the transmission signal generator unit 402 to the radio source, and outputs the mapped uplink signal to the transmission/reception unit 203. The mapping unit 403 can be configured by the mapper, the mapping circuit or the mapping device, which are described based on the common recognition in the technical field according to the present invention.

The reception signal processor unit 404 executes the reception process (such as de-mapping, demodulation and decoding) for the reception signal inputted from the transmission/reception unit 203. The reception signal is exemplified by the downlink signal (the downlink control signal, the downlink data signal, the downlink reference signal) transmitted from the wireless base station 10. The reception signal processor unit 404 can be configured by the signal processor, the signal processor circuit or the signal processor device, which are described based on the common recognition in the technical field according to the present invention. The reception signal processor unit 404 can configure a reception unit according to the present invention.

The reception signal processor unit 404 blind-decodes, based on the instruction given from the control unit 401, the DCI (a DCI format) for scheduling the transmission and/or the reception of data (TB: Transport Block) of a given TTI. For example, the reception signal processor unit 404 may decode the DCI by executing a de-masking process using a predetermined identifier (RNTI: Radio Network Temporary Identifier), and may also decode the DCI on the assumption of a given payload size.

The reception signal processor unit 404 outputs the information decoded by the reception process to the control unit 401. The reception signal processor unit 404 outputs, e.g., the broadcast information, the system information, the RRC signaling and the DCI to the control unit 401. The reception signal processor unit 404 outputs the reception signal and a post-reception-processing signal to the sounding unit 405.

The sounding unit 405 carries out the sounding (quality testing) with respect to the received signal. The sounding unit 405 can be configured by the sounding instrument, the sounding circuit or the sounding device, which are described based on the common recognition in the technical field according to the present invention. Note that the sounding unit 405 can configure the reception unit according to the present invention.

The sounding unit 405 may estimate the reception power (e.g., RSRP), the reception quality (e.g., RSRQ) and the channel state of the received signal. An estimation result may be outputted to the control unit 401.

Note that the block diagrams referred to for describing the embodiments illustrate the blocks on a function basis. Those function blocks (function units) are attained by arbitrarily combining hardware components and software modules. Means configured to attain the respective function blocks are not particularly limited. To be specific, each function block may be attained by one physically integrated apparatus, and may also be attained by plural, i.e., two or more physically separated apparatuses that are interconnected wiredly or wirelessly.

For example, part or the whole of the functions of the wireless base station 10 and the user equipment 20 may be attained by using the hardware instanced by an ASIC (Application Specific Integrated Circuit), a PLD (Programmable Logic Device) and an FPGA (Field Programmable Gate Array). Each of the wireless base station 10 and the user equipment 20 may be attained by a computer apparatus including a processor (CPU (Central Processing Unit)), a communication interface for establishing the connection to the network, a memory, and a non-transitory computer readable storage medium retaining programs. In other words, each of the wireless base station, the user equipment and other equivalent apparatuses according to one embodiment may function as a computer that executes the processes of the wireless communication method according to the present invention.

The processor, the memory and other equivalent components are interconnected via a bus for communicating the information. The non-transitory computer readable recording medium is a storage medium instanced by a flexible disk, a magneto-optical disk, a ROM (Read Only Memory), an EPROM (Erasable Programmable ROM), a CD-ROM (Compact Disc-ROM), a RAM (Random Access Memory) and a hard disk. The programs may be transmitted from the network via a telecommunication line. Each of the wireless base station 10 and the user equipment 20 may include an input device instanced by input keys, and an output device instanced by a display.

The configurations of the functions of the wireless base station 10 and the user equipment 20 may be attained hardwarewise, may also be attained by software modules implemented by the processor, and may further be attained by a combination of both of the software modules and the hardware components. The processor controls the whole of the user equipment by operating an Operating System (OS). The processor reads the programs, the software modules and the data from the storage medium into the memory, and executes the variety of processes in accordance with these categories of software.

It may be sufficient that the program is compiled to cause the computer to perform the respective operations described in the embodiments discussed above. For example, the control unit 401 of the user equipment 20 may be attained by a control program stored in the memory and running on the processor, and other function blocks may be attained in the same way.

The software, the instructions and other equivalents may be transmitted and received via a transmission medium. For instance, when the software is transmitted from a web site, a server or other remote sources by employing wired (cable) technologies exemplified by a coaxial cable, an optical fiber cable, a twist pair and a digital subscriber line (DSL) and/or wireless (radio) technologies exemplified by infrared-rays, radio transmission and microwaves, the wired technologies and/or the wireless technologies are encompassed within definitions of the transmission mediums.

Note that the terminologies explained in the present specification and/or the terminologies available for comprehending the present specification may be replaced with terminologies having the same or similar meanings. For example, the channel and/or the symbol may be defined as the signal (signaling). The signal may be defined as a message. The component carrier (CC) may be called a carrier frequency, a cell and other equivalent technical terms.

The information, the parameters and other equivalents explained in the present specification may be expressed by absolute values, may also be expressed by relative values from a certain reference value, and may further be expressed by different types of information corresponding to thereto. For instance, the radio resource may be what is indicated by an index.

The information, the signal and other equivalents explained in the present specification may also be expressed by making use of any of multiple different technologies. For example, the data, the instruction, the command, the information, the signal, the bit, the symbol, the chip and other equivalents, which are stated in the foregoing descriptions throughout, may be expressed by a voltage, an electric current, an electromagnetic wave, a magnetic field or a magnetic particle, a photo field or a photon, or by combinations thereof.

The respective modes/embodiments discussed in the present specification may be solely used, may also be used in combination, and may further be used by being switched over along with the execution thereof. The notification of a certain item of information (e.g., the notification of "being X") may be made not only explicitly but also implicitly (e.g., this may be fulfilled by not making the notification of a certain item of information).

The notification of the information may be made by other methods without being limited to the modes/embodiments discussed in the present specification. For example, the notification of the information may be carried out by the physical layer signaling (e.g., the DCI (Downlink Control Information), the UCI (Uplink Control Information)), the higher layer signaling (e.g., RRC (Radio Resource Control) signaling, MAC (Medium Access Control) signaling, the broadcast information (MIB (Master Information Block), SIB (System Information Block))), other signals or combinations thereof. The RRC signaling may be called an RRC message and may also be, e.g., an RRC connection setup (RRCConnectionSetup) message and an RRC connection reconfiguration (RRCConnectionReconfiguration) message.

The modes/embodiments discussed in the present specification may be applied to systems utilizing the existing systems, and/or next generation systems being scalable based on these existing systems instanced by LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other proper systems.

The processing procedures, the sequences and the flowcharts in the modes/embodiments discussed in the present specification may be replaced in order unless contradictory. For instance, the method described in the present specification exhibits elements of a variety of steps in an exemplary order, but the embodiment is not limited to the exhibited specific order.

The in-depth description of the present invention has been described so far, and it is, however, apparent to persons skilled in the art that the present invention is not limited to the embodiments discussed in the present specification. The present invention can be carried out by way of amended and modified embodiments without departing from the spirit and scope of the present invention, which are defined by the description of the scope of claims. The description of the present specification is therefore intended for illustrative explanation only and does not impose any limited interpretation on the present invention.

It is to be noted that the present application is based on Japanese Patent Application No. 2015-173259 filed on Sep. 2, 2015, and the entire contents thereof are incorporated by reference in the present specification.

The invention claimed is:

1. A terminal comprising:
  a receiver that receives downlink control information and a Physical Downlink Shared Channel (PDSCH) by using a plurality of transmission time intervals (TTIs) contained in one subframe; and
  a processor that controls to receive the PDSCH through at least one of the plurality of TTIs based on the downlink control information,
  wherein the receiver receives a second downlink control channel including the downlink control information through a second TTI among the plurality of TTIs in the subframe, following a first TTI among the plurality of TTIs where a first downlink control channel is allocated,
  wherein the second TTI has a length that is different from a length of the first TTI,
  wherein the length of the first TTI is shorter than 1 ms,
  wherein a number of TTIs in the subframe is based on a subcarrier spacing, and
  wherein
    the processor informs of a capability for reception of the downlink control information and the PDSCH by using the plurality of TTIs,
    the receiver receives information about the plurality of TTIs by higher layer signaling, and
    the processor controls, based on the information, to receive the downlink control information and the PDSCH.

2. A wireless communication method in a terminal, comprising:
  informing a capability for reception of downlink control information and a Physical Downlink Shared Channel (PDSCH) by using a plurality of transmission time intervals (TTIs),
  receiving information about the plurality of TTIs by higher layer signaling,
  receiving the downlink control information and the PDSCH, based on the information, by using the plurality of TTIs contained in one subframe;
  receiving a second downlink control channel including the downlink control information through a second TTI among the plurality of TTIs in the subframe, following a first TTI among the plurality of TTIs where a first downlink control channel is allocated; and
  controlling to receive the PDSCH through at least one of the plurality of TTIs based on the downlink control information,
  wherein the second TTI has a length that is different from a length of the first TTI,
  wherein the length of the first TTI is shorter than 1 ms, and
  wherein a number of TTIs in the subframe is based on a subcarrier spacing.

* * * * *